(12) United States Patent
Nam et al.

(10) Patent No.: US 11,357,039 B2
(45) Date of Patent: Jun. 7, 2022

(54) FEEDBACK FOR MULTICAST COMMUNICATIONS

(71) Applicant: QUALCOMM Incorporated, San Diego, CA (US)

(72) Inventors: Wooseok Nam, San Diego, CA (US); Juan Montojo, San Diego, CA (US); Tao Luo, San Diego, CA (US); Wanshi Chen, San Diego, CA (US); Peter Pui Lok Ang, San Diego, CA (US); Peter Gaal, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 16/863,782

(22) Filed: Apr. 30, 2020

(65) Prior Publication Data

US 2020/0351933 A1 Nov. 5, 2020

Related U.S. Application Data

(60) Provisional application No. 62/842,843, filed on May 3, 2019.

(51) Int. Cl.
*H04W 72/14* (2009.01)
*H04W 72/04* (2009.01)
(Continued)

(52) U.S. Cl.
CPC .......... *H04W 72/14* (2013.01); *H04L 1/1819* (2013.01); *H04L 5/0055* (2013.01); *H04W 24/08* (2013.01);
(Continued)

(58) Field of Classification Search
None
See application file for complete search history.

(56) References Cited

U.S. PATENT DOCUMENTS 8,565,167 B2 * 10/2013 Chen .................. H04L 5/001
370/329
9,467,819 B2 * 10/2016 Niu .................. H04L 5/0055
(Continued)

FOREIGN PATENT DOCUMENTS

WO WO-2018056108 A1 3/2018

OTHER PUBLICATIONS

International Search Report and Written Opinion—PCT/US2020/031129—ISA/EPO—dated Aug. 21, 2020.

*Primary Examiner* — Ayaz R Sheikh
*Assistant Examiner* — Faiyazkhan Ghafoerkhan
(74) *Attorney, Agent, or Firm* — Holland & Hart LLP

(57) ABSTRACT

Methods, systems, and devices for wireless communications are described that support feedback for multicast communications. A user equipment (UE) in a group of UEs may receive multicast information from a base station in a downlink (DL) transmission scheduled by a DL grant. The DL grant may also indicate a set of uplink resources for the group of UEs to use to transmit feedback. The UE may attempt to decode a message containing the multicast information in the DL transmission. If the UE determines the message was successfully decoded, the UE may send no feedback to the base station. If the UE determines the message was not successfully decoded, the UE may transmit a feedback message to the base station to indicate the message was unsuccessfully decoded. The base station may monitor for the feedback message and determine to retransmit the multicast information if the feedback message is received.

29 Claims, 21 Drawing Sheets

(51) Int. Cl.
*H04W 24/08* (2009.01)
*H04W 74/08* (2009.01)
*H04L 1/18* (2006.01)
*H04L 5/00* (2006.01)

(52) U.S. Cl.
CPC ....... *H04W 72/042* (2013.01); *H04W 72/046* (2013.01); *H04W 74/0833* (2013.01)

(56) References Cited

U.S. PATENT DOCUMENTS

| | | | |
|---|---|---|---|
| 10,841,117 B2 * | 11/2020 | Seo | H04L 1/0026 |
| 10,999,824 B2 * | 5/2021 | Parkvall | H04L 1/1861 |
| 2011/0002276 A1 * | 1/2011 | Chen | H04L 1/1861 370/329 |
| 2011/0243066 A1 * | 10/2011 | Nayeb Nazar | H04L 1/1671 370/328 |
| 2014/0226552 A1 * | 8/2014 | Niu | H04L 5/0055 370/312 |
| 2017/0013612 A1 * | 1/2017 | Nayeb Nazar | H04W 72/0446 |
| 2017/0245262 A1 * | 8/2017 | Nayeb Nazar | H04W 72/0413 |
| 2018/0115430 A1 * | 4/2018 | Seo | H04W 76/27 |
| 2018/0302896 A1 * | 10/2018 | Nayeb Nazar | H04L 5/0053 |
| 2018/0367262 A1 * | 12/2018 | Hwang | H04L 1/1854 |
| 2019/0349918 A1 * | 11/2019 | Nayeb Nazar | H04W 72/0446 |
| 2020/0120663 A1 * | 4/2020 | Parkvall | H04L 1/1854 |
| 2020/0204329 A1 * | 6/2020 | Fujishiro | H04L 1/1861 |
| 2020/0351933 A1 * | 11/2020 | Nam | H04L 5/0055 |

* cited by examiner

FEEDBACK FOR MULTICAST COMMUNICATIONS

CROSS REFERENCE

The present application for Patent claims the benefit of U.S. Provisional Patent Application No. 62/842,843 by NAM et al., entitled "FEEDBACK FOR MULTICAST COMMUNICATIONS," filed May 3, 2019, assigned to the assignee hereof, and expressly incorporated by reference herein.

BACKGROUND

The following relates generally to wireless communications, and more specifically to feedback for multicast communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may support multicast communications with UEs, in which the system transmits information to multiple UEs simultaneously. The system may transmit the information using a base station associated with the system. The base station may transmit multicast information to all UEs in a cell, or the base station may transmit the information to a group of UEs in the cell.

SUMMARY

The described techniques relate to improved methods, systems, devices, and apparatuses that support feedback for multicast communications. Generally, the described techniques provide for a user equipment (UE) to provide feedback to a base station after receiving multicast information. A UE in a group of UEs may receive multicast information from a base station in a downlink (DL) transmission scheduled by a DL grant. The DL grant may also indicate a set of uplink (UL) resources for the group of UEs to use to transmit feedback. The UE may attempt to decode a message containing the multicast information in the DL transmission. If the UE determines the message was successfully decoded, the UE may send no feedback to the base station. If the UE determines the message was not successfully decoded, the UE may transmit a feedback message to the base station to indicate the message was unsuccessfully decoded. The base station may monitor for the feedback message and determine to retransmit the multicast information if the feedback message is received.

A method of wireless communications at a UE is described. The method may include receiving, from a base station, a DL grant that indicates a set of DL resources for a DL transmission to a set of UEs including the UE, identifying a set of UL resources for negative acknowledgment feedback information corresponding to the DL transmission based on the DL grant, monitoring the set of DL resources for the DL transmission from the base station, and transmitting a feedback message to the base station via the set of UL resources based on the monitoring, where the feedback message indicates that reception of the DL transmission was unsuccessful.

An apparatus for wireless communications at a UE is described. The apparatus may include a processor, memory in electronic communication with the processor, and instructions stored in the memory. The instructions may be executable by the processor to cause the apparatus to receive, from a base station, a DL grant that indicates a set of DL resources for a DL transmission to a set of UEs including the UE, identify a set of UL resources for negative acknowledgment feedback information corresponding to the DL transmission based on the DL grant, monitor the set of DL resources for the DL transmission from the base station, and transmit a feedback message to the base station via the set of UL resources based on the monitoring, where the feedback message indicates that reception of the DL transmission was unsuccessful.

Another apparatus for wireless communications at a UE is described. The apparatus may include means for receiving, from a base station, a DL grant that indicates a set of DL resources for a DL transmission to a set of UEs including the UE, identifying a set of UL resources for negative acknowledgment feedback information corresponding to the DL transmission based on the DL grant, monitoring the set of DL resources for the DL transmission from the base station, and transmitting a feedback message to the base station via the set of UL resources based on the monitoring, where the feedback message indicates that reception of the DL transmission was unsuccessful.

A non-transitory computer-readable medium storing code for wireless communications at a UE is described. The code may include instructions executable by a processor to receive, from a base station, a DL grant that indicates a set of DL resources for a DL transmission to a set of UEs including the UE, identify a set of UL resources for negative acknowledgment feedback information corresponding to the DL transmission based on the DL grant, monitor the set of DL resources for the DL transmission from the base station, and transmit a feedback message to the base station via the set of UL resources based on the monitoring, where the feedback message indicates that reception of the DL transmission was unsuccessful.

Some examples of the method, apparatuses, and non-transitory computer-readable medium described herein may further include operations, features, means, or instructions for receiving the DL grant via a DL transmission beam configured for the set of UEs.

Some examples of the method, apparatuses, and non-transitory computer-readable medium described herein may further include operations, features, means, or instructions for receiving one or more additional DL grants via respective DL transmission beams, where each additional DL grant indicates a respective additional set of DL resources for the DL transmission, identifying additional sets of UL resources for negative acknowledgment feedback information corresponding to the DL transmission based on the one or more additional DL grants, and monitoring the additional sets of DL resources for the DL transmission from the base station.

Some examples of the method, apparatuses, and non-transitory computer-readable medium described herein may further include operations, features, means, or instructions for transmitting an additional feedback message to the base station via a respective set of UL resources based on monitoring the additional sets of DL resources, where the additional feedback message indicates that reception of the DL transmission was unsuccessful.

Some examples of the method, apparatuses, and non-transitory computer-readable medium described herein may further include operations, features, means, or instructions for combining information received via the additional sets of DL resources based on the monitoring, determining that reception of the DL transmission was unsuccessful based on the combining, and transmitting a set of feedback messages including the feedback message over respective sets of UL resources for negative acknowledgment feedback information.

Some examples of the method, apparatuses, and non-transitory computer-readable medium described herein may further include operations, features, means, or instructions for measuring a link quality of a set of UL transmission beams configured for communications with the base station, and transmitting the feedback message via at least one of the set of UL transmission beams based on the link quality.

Some examples of the method, apparatuses, and non-transitory computer-readable medium described herein may further include operations, features, means, or instructions for determining that a decoding procedure for the DL transmission was unsuccessful based on the monitoring, and transmitting the feedback message based on determining that the decoding procedure for the DL transmission was unsuccessful.

Some examples of the method, apparatuses, and non-transitory computer-readable medium described herein may further include operations, features, means, or instructions for receiving, from the base station, a second DL grant that indicates a second set of DL resources for a retransmission of the DL transmission to the UE in response to the feedback message, and monitoring the second set of DL resources for the retransmission of the DL transmission.

Some examples of the method, apparatuses, and non-transitory computer-readable medium described herein may further include operations, features, means, or instructions for transmitting, based on monitoring the second set of DL resources, a second feedback message to the base station via a second set of UL resources for negative acknowledgment feedback information indicated by the second DL grant, where the feedback message indicates that reception of the retransmission was unsuccessful.

In some examples of the method, apparatuses, and non-transitory computer-readable medium described herein, the set of UL resources includes physical uplink control channel (PUCCH), a physical uplink shared channel (PUSCH), a random access channel (RACH), UL resources within a system bandwidth, UL resources outside the system bandwidth, or any combination thereof.

Some examples of the method, apparatuses, and non-transitory computer-readable medium described herein may further include operations, features, means, or instructions for receiving the DL grant via a physical downlink control channel (PDCCH). In some examples of the method, apparatuses, and non-transitory computer-readable medium described herein, monitoring the set of DL resources may include operations, features, means, or instructions for monitoring a physical downlink shared channel (PDSCH) for the DL transmission. In some examples of the method, apparatuses, and non-transitory computer-readable medium described herein, the feedback message includes a hybrid automatic repeat request (HARQ) negative acknowledgment (NACK) message, a bit sequence, a message preamble, or a combination thereof.

In some examples of the method, apparatuses, and non-transitory computer-readable medium described herein, the DL grant includes a feedback timing indicator that indicates the set of UL resources. In some examples of the method, apparatuses, and non-transitory computer-readable medium described herein, the feedback timing indicator includes a PDSCH to HARQ feedback timing indicator. In some examples of the method, apparatuses, and non-transitory computer-readable medium described herein, the UL resource indicator includes a PUCCH resource indicator. In some examples of the method, apparatuses, and non-transitory computer-readable medium described herein, the UL resource indicator and the feedback timing indicator may be included in downlink control information (DCI) containing the DL grant.

A method of wireless communications at a base station is described. The method may include determining a set of DL resources for a DL transmission to a set of UEs, determining a set of UL resources for negative acknowledgment feedback information corresponding to the DL transmission, transmitting, to the set of UEs, a DL grant indicating the set of DL resources for the DL transmission and the set of UL resources for negative acknowledgment feedback information corresponding to the DL transmission, and monitoring the set of UL resources for a feedback message from at least one UE of the set of UEs, where the feedback message indicates that reception of the DL transmission at the at least one UE was unsuccessful.

An apparatus for wireless communications at a base station is described. The apparatus may include a processor, memory in electronic communication with the processor, and instructions stored in the memory. The instructions may be executable by the processor to cause the apparatus to determine a set of DL resources for a DL transmission to a set of UEs, determine a set of UL resources for negative acknowledgment feedback information corresponding to the DL transmission, transmit, to the set of UEs, a DL grant indicating the set of DL resources for the DL transmission and the set of UL resources for negative acknowledgment feedback information corresponding to the DL transmission, and monitor the set of UL resources for a feedback message from at least one UE of the set of UEs, where the feedback message indicates that reception of the DL transmission at the at least one UE was unsuccessful.

Another apparatus for wireless communications at a base station is described. The apparatus may include means for determining a set of DL resources for a DL transmission to a set of UEs, determining a set of UL resources for negative acknowledgment feedback information corresponding to the DL transmission, transmitting, to the set of UEs, a DL grant indicating the set of DL resources for the DL transmission and the set of UL resources for negative acknowledgment feedback information corresponding to the DL transmission, and monitoring the set of UL resources for a feedback message from at least one UE of the set of UEs, where the feedback message indicates that reception of the DL transmission at the at least one UE was unsuccessful.

A non-transitory computer-readable medium storing code for wireless communications at a base station is described. The code may include instructions executable by a processor to determine a set of DL resources for a DL transmission to a set of UEs, determine a set of UL resources for negative acknowledgment feedback information corresponding to the DL transmission, transmit, to the set of UEs, a DL grant indicating the set of DL resources for the DL transmission and the set of UL resources for negative acknowledgment feedback information corresponding to the DL transmission, and monitor the set of UL resources for a feedback message from at least one UE of the set of UEs, where the feedback message indicates that reception of the DL transmission at the at least one UE was unsuccessful.

Some examples of the method, apparatuses, and non-transitory computer-readable medium described herein may further include operations, features, means, or instructions for determining a set of DL transmission beams configured for the set of UEs, and transmitting the DL grant to the set of UEs via one or more DL transmission beams of the set of DL transmission beams.

Some examples of the method, apparatuses, and non-transitory computer-readable medium described herein may further include operations, features, means, or instructions for transmitting one or more additional DL grants via respective DL transmissions beams, where each additional DL grant indicates a respective set of DL resources for the DL transmission and a respective set of UL resources for negative acknowledgment feedback information corresponding to the DL transmission.

Some examples of the method, apparatuses, and non-transitory computer-readable medium described herein may further include operations, features, means, or instructions for monitoring the respective sets of UL resources for the feedback message from the at least one UE, where the feedback message indicate that reception of the DL transmission at the at least one UE via the one or more DL transmission beams was unsuccessful.

Some examples of the method, apparatuses, and non-transitory computer-readable medium described herein may further include operations, features, means, or instructions for receiving the feedback message from the at least one UE based on monitoring the set of UL resources, and transmitting, to the set of UEs, a second DL grant that indicates a second set of DL resources for a retransmission of the DL transmission in response to the feedback message and a second set of UL resources for negative acknowledgment feedback information corresponding to the retransmission.

Some examples of the method, apparatuses, and non-transitory computer-readable medium described herein may further include operations, features, means, or instructions for identifying a DL transmission beam and DL resources corresponding to UL resources over which the feedback message from the at least one UE may be received, and transmitting the second DL grant via the DL transmission beam and the DL resources.

In some examples of the method, apparatuses, and non-transitory computer-readable medium described herein, the set of UL resources includes a PUCCH, a PUSCH, a RACH, UL resources within a system bandwidth, UL resources outside the system bandwidth, or any combination thereof.

Some examples of the method, apparatuses, and non-transitory computer-readable medium described herein may further include operations, features, means, or instructions for determining respective sets of UL resources for each UE of the set of UEs for negative acknowledgment feedback information corresponding to the DL transmission, where the DL grant indicates the respective sets of UL resources. In some examples of the method, apparatuses, and non-transitory computer-readable medium described herein, at least two of the respective sets of UL resources at least partially overlap.

Some examples of the method, apparatuses, and non-transitory computer-readable medium described herein may further include operations, features, means, or instructions for determining a common sequence and a common time and frequency resource mapping for the set of UEs, and transmitting an indication of the common sequence and the common time and frequency resource mapping to the set of UEs.

In some examples of the method, apparatuses, and non-transitory computer-readable medium described herein, the DL grant includes an UL resource indicator and a feedback timing indicator that indicates the set of UL resources. In some examples of the method, apparatuses, and non-transitory computer-readable medium described herein, the feedback timing indicator includes a PDSCH to HARQ feedback timing indicator. In some examples of the method, apparatuses, and non-transitory computer-readable medium described herein, the UL resource indicator includes a PUCCH resource indicator. Some examples of the method, apparatuses, and non-transitory computer-readable medium described herein may further include operations, features, means, or instructions for transmitting DCI to the set of UEs, the DCI including the UL resource indicator and the feedback timing indicator. In some examples of the method, apparatuses, and non-transitory computer-readable medium described herein, transmitting the DL grant may include operations, features, means, or instructions for transmitting the DL grant in a PDCCH.

Some examples of the method, apparatuses, and non-transitory computer-readable medium described herein may further include operations, features, means, or instructions for transmitting the DL transmission in a PDSCH. In some examples of the method, apparatuses, and non-transitory computer-readable medium described herein, the feedback message includes a NACK message.

DETAILED DESCRIPTION

Figure 1:
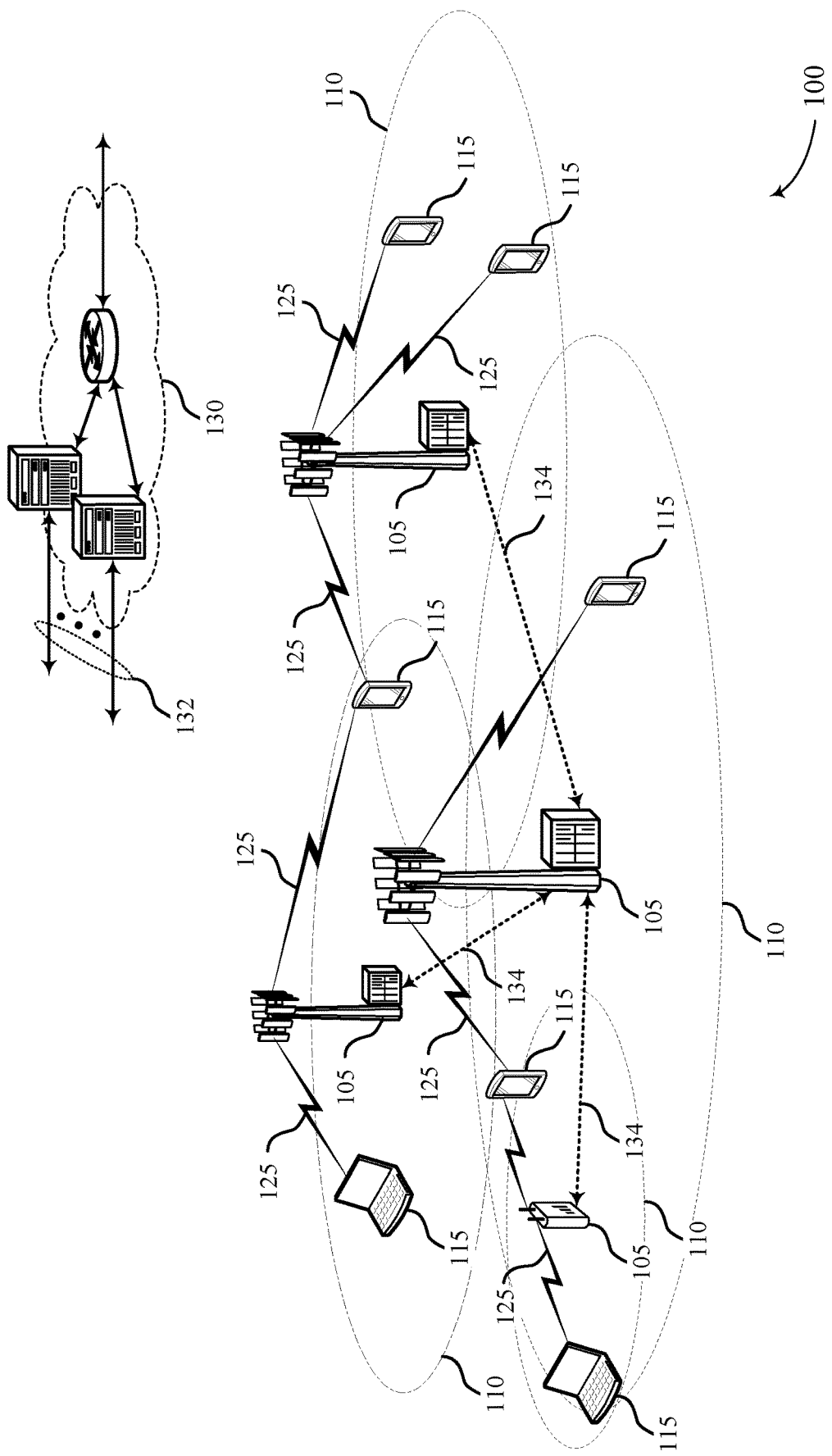
FIGS. 1 through 3 illustrate examples of a wireless communications system that supports feedback for multicast communications in accordance with aspects of the present disclosure.

A wireless communications network may support multicast communications with user equipment (UE), in which the network transmits information to multiple UEs over a multicast channel. The network may transmit the information using a base station associated with the network. The base station may transmit multicast information to all UEs in a cell, or the base station may transmit the information to a group of UEs in the cell. The base station may determine the group of UEs based on location, device type, mobility, and the like.

It may be challenging for the base station to support or respond to feedback from the UEs that receive the multicast information. For example, if feedback for multicast transmissions were supported, multiple UEs in the cell may attempt to transmit feedback concurrently, either to acknowledge the multicast information was received or report that reception or decoding the multicast information was unsuccessful. This concurrent feedback transmission may result in collision or congestion of uplink (UL) resources and increased system overhead for the base station and network. Additionally, the network may transmit multicast information a single time (i.e., without repetition), and therefore the group of UEs may not be able to combine repeated transmissions to improve decoding reliability.

Techniques are provided herein that support feedback for multicast communications. A UE in a group of UEs may receive multicast information from a base station in a downlink (DL) transmission scheduled by a DL grant. The UE may attempt to decode a message containing the multicast information in the DL transmission. If the UE determines the message was successfully decoded, the UE may send no feedback to the base station. If the UE determines the message was not successfully decoded, the UE may transmit negative acknowledgment (NACK) feedback to the base station to indicate the message was unsuccessfully decoded.

The DL grant may also indicate a set of UL resources for the group of UEs to use to transmit NACK feedback. The set of UL resources may include time and frequency resources in which the group of UEs may transmit NACK feedback to the base station. Each UE in the group of UEs may be directed to use UL resources in the set of UL resources, and the UL resources for each UE may at least partially overlap. After transmitting the DL grant and DL transmission, the base station may monitor the indicated set of UL resources for NACK feedback. If the base station receives NACK feedback in the indicated set of UL resources from at least one UE of the group of UEs, the base station may determine to retransmit the multicast information to the group of UEs in a subsequent DL transmission scheduled by a DL grant.

In some examples, such as in millimeter wave (mmW) applications, the base station may transmit the multicast information in a beam sweeping procedure. The multicast information may be transmitted via multiple DL transmission beams (e.g., in a time division multiplexing (TDM) configuration). The base station may transmit a DL grant via each DL transmission beam, where each DL grant schedules a respective DL transmission and a respective set of UL resources for NACK feedback. In some examples, each set of UL resources may have a spatial relationship with the associated DL transmission beam, i.e., a UL transmission on the set of UL resources may be transmitted on a UL transmission beam associated with the DL transmission beam. In some examples, such as when a correspondence exists between a DL transmission beam and a UL reception beam, the base station may receive NACK feedback for the multicast information transmitted via the DL transmission beam via the corresponding UL reception beam. In some examples, such as when a correspondence exists between a UL transmission beam and a DL reception beam, the UE may transmit NACK feedback for the multicast information received via the DL reception beam via the corresponding UL transmission beam.

The beam sweeping procedure may allow a UE to receive repetitions of the multicast information via multiple DL transmission beams. Each DL transmission beam may be associated with a sub-group of UEs, and a given UE may belong to multiple sub-groups of UEs. The UE may receive DL transmissions scheduled by their respective DL grants via multiple DL transmission beams. The UE may combine the DL transmissions before attempting to decode the message in order to improve decoding reliability. If the UE does not successfully decode the message, even after combining, the UE may transmit NACK feedback in UL resources indicated by one or more of the DL grants. In some examples, the UE may transmit NACK feedback in UL resources indicated by multiple DL grants. In other examples, the UE may transmit NACK feedback in UL resources indicated by a single DL grant, where the UE determines which UL resources to use based on the link quality (e.g., a UE may transmit NACK feedback in UL resources associated with the strongest link quality). The base station may monitor the UL resources indicated by each DL grant, and determine to retransmit the multicast information in DL resources via DL transmission beams that correspond to those UL resources in which NACK feedback is received.

The UE may use UL resources to transmit NACK feedback as indicated by the DL grant. In some examples, the UE may use UL resources as indicated in a physical downlink shared channel (PDSCH) to hybrid automatic repeat request (HARQ) feedback timing indicator or a physical uplink control channel (PUCCH) resource indicator, such as resources identified in a PDSCH-to-HARQ_feedback timing indicator field or a PUCCH resource indicator field in DL control information (DCI) in a physical downlink control channel (PDCCH) containing the DL grant. The PDSCH to HARQ feedback timing indicator or the PUCCH resource indicator may indicate UL resources the UE may use to transmit HARQ feedback for unicast information, and the UE may use the same UL resources for transmitting the NACK feedback for the multicast information. In some examples, the UL resources for transmitting the NACK feedback may be included in a PUCCH, a physical uplink shared channel (PUSCH), a random access channel (RACH), or other resources configured and/or indicated inside or outside a system bandwidth, or a combination thereof.

In some examples, the UE may transmit the NACK feedback in a HARQ NACK message, a special bit sequence (e.g., a bit sequence unique to NACK feedback or other feedback messages), a message preamble, or a combination thereof. In some examples, the UE may transmit NACK feedback based on a single-frequency network (SFN) configuration. The group of UEs may transmit NACK feedback using a common waveform, a common sequence, a common resource mapping, or a combination thereof. The base station may determine that the NACK feedback was received from at least one UE in the group of UEs and in some cases, may not identify how many UEs or which UEs in the group of UEs transmit NACK feedback. In response to the received NACK feedback, the base station may perform a retransmission of the multicast information (e.g., via a different transmission beam or using different DL resources).

Aspects of the disclosure are initially described in the context of wireless communications systems. Additional examples of transmission timelines and a process flow are then discussed. Aspects of the disclosure are further illustrated by and described with reference to apparatus diagrams, system diagrams, and flowcharts that relate to feedback for multicast communications.

FIG. 1 illustrates an example of a wireless communications system 100 that supports feedback for multicast communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include UL transmissions from a UE 115 to a base station 105, or DL transmissions from a base station 105 to a UE 115. DL transmissions may also be called forward link transmissions while UL transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include DL transmissions, UL transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas.

Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be DL or UL (e.g., in an FDD mode), or be configured to carry DL and UL communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a DL carrier, for example, using TDM techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple DL component carriers and one or more UL component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may transmit system information to UEs 115 via a broadcast channel. For example, in an NR system, a master information block (MIB) may be delivered by a physical broadcast channel (PBCH), a system information block (SIB) such as SIB1 may be delivered via a DL shared channel (DL-SCH) as configured by a remaining minimum system information (RMSI) parameter, and other SIBs may be delivered via DL-SCH(s) as configured by an other system information (OSI) parameter. Broadcast system information may be common for all UEs 115 in a coverage area 110. Because the broadcast system information is sent to multiple UEs 115 distributed across the coverage area 110, the base station 105 may transmit the broadcast channel with a high reliability to a large area.

The base station 105 may transmit information to a UE 115 based on a dynamic scheduling method, such as a DL grant in a PDCCH scheduling a DL transmission in a PDSCH. For a scheduled transmission, the network may support feedback via a HARQ feedback process. In the HARQ process, the UE 115 may transmit an acknowledgment (ACK) message to indicate the UE 115 successfully received the transmission, or the UE 115 may transmit a NACK message to indicate the UE 115 did not successfully received the transmission. In some examples, the UE 115 may transmit the ACK message or the NACK message in a HARQ feedback resource, such as in a physical uplink control channel (PUCCH). The base station 105 may retransmit the DL grant and the DL transmission upon receiving the NACK message.

In some examples, the base station 105 may transmit the broadcast system information to multiple UEs 115 based on the dynamic scheduling method. However, the base station 105 may not support HARQ feedback for the broadcast system information. A UE 115 may be unable to indicate to the network whether the UE 115 successfully received and decoded the broadcast system information system, and/or the base station 105 may not support retransmission of the broadcast system information based on UEs 115 transmitting NACK feedback. However, the UEs 115 may still receive multiple transmissions of the broadcast system information, which the UEs 115 may use to retry failed decoding or combine before decoding in order to improve decoding reliability.

A base station 105 may also transmit multicast information other than system information to a group of UEs 115. Similar to the case of the broadcast system information, it may be challenging for the base station 105 to support or respond to feedback (e.g., HARQ feedback) from the UEs 115 that receive the multicast information. For example, multiple UEs 115 in the group may attempt to transmit HARQ feedback simultaneously, either in an ACK message or a NACK message. This simultaneous HARQ feedback transmission may result in collision or congestion of UL resources and increased system overhead for the base station and network. Additionally, the base station 105 may transmit multicast information at a single occasion (i.e., without repetition), and so the group of UEs 115 may not be able to combine repeated transmissions to improve decoding reliability.

Techniques are provided herein that support feedback for multicast communications. A UE 115 in a group of UEs 115 may receive multicast information from a base station 105 in a DL transmission scheduled by a DL grant. In some examples, the base station 105 may transmit the multicast information in a beam sweeping procedure. The UE 115 may attempt to decode a message containing the multicast information in the DL transmission. If the UE 115 determines the message was successfully decoded, the UE 115 may determine to send no feedback to the base station. If the UE 115 determines the message was not successfully decoded, the UE 115 may transmit NACK feedback to the base station 105 to indicate the message was unsuccessfully decoded.

The DL grant may also indicate a set of UL resources for the group of UEs 115 to use to transmit NACK feedback. The set of UL resources may include time and frequency resources in which the group of UEs 115 may transmit NACK feedback to the base station. Each UE 115 in the group of UEs 115 may be directed to use specific UL resources in the set of UL resources, and the UL resources for each UE 115 may at least partially overlap. In some examples, the UEs 115 may transmit NACK feedback in UL resources via a UL transmission beam.

After transmitting the DL grant and DL transmission, the base station 105 may monitor the indicated set of UL resources for NACK feedback. If the base station 105 receives NACK feedback in the indicated set of UL resources from at least one UE 115 of the group of UEs 115, the base station 105 may determine to retransmit the multicast information to the group of UEs 115 in a subsequent DL transmission scheduled by a DL grant. In some examples, the base station 105 may determine to retransmit the multicast information in DL resources via DL transmission beams that correspond to those UL resources in which NACK feedback is received.

Figure 2:
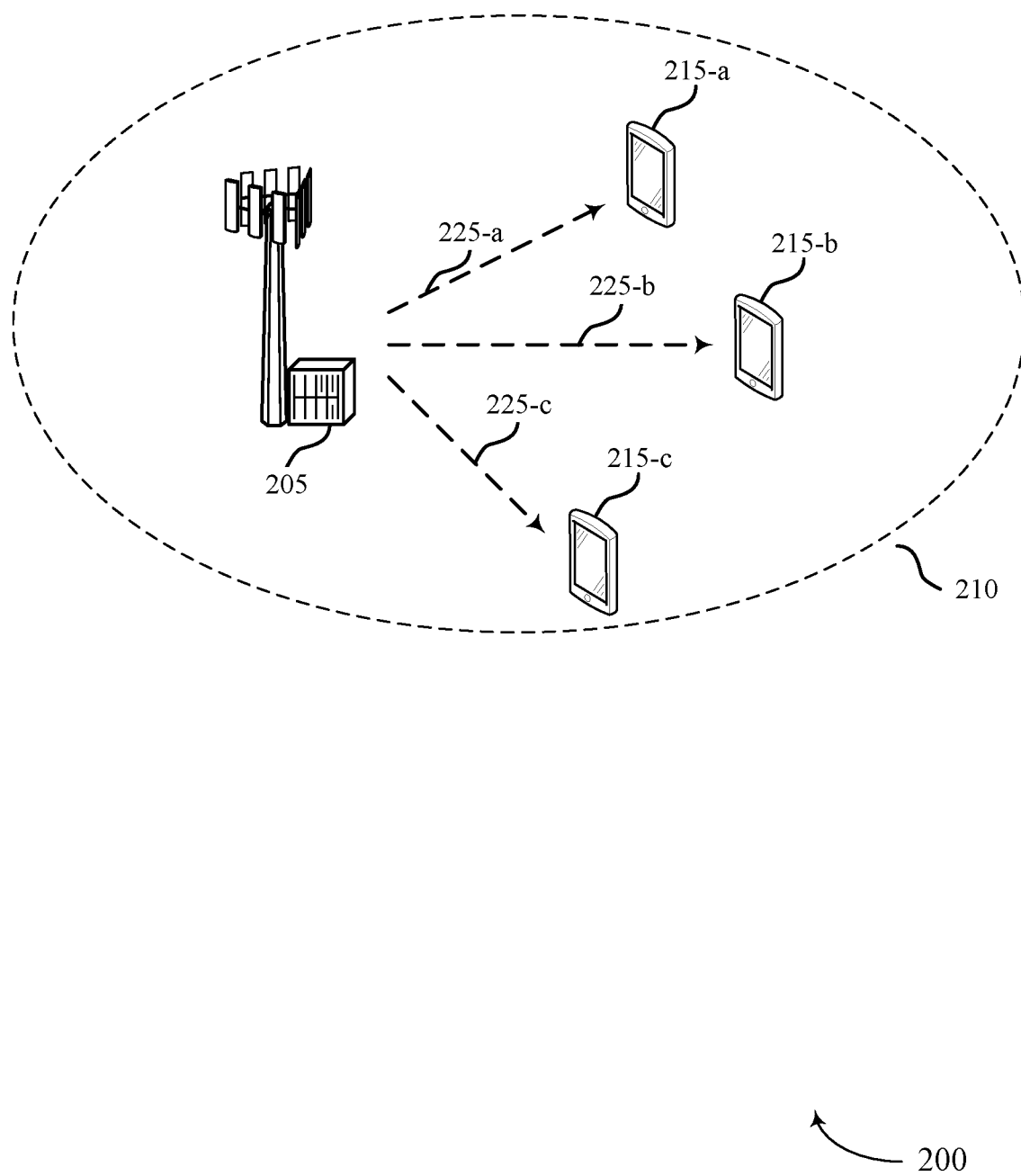

FIG. 2 illustrates an example of a wireless communications system 200 that supports feedback for multicast communications in accordance with aspects of the present disclosure. In some examples, wireless communications system 200 may implement aspects of wireless communication system 100. The wireless communications system 200 may include base station 205 and UEs 215, which may be examples of a base station 105 and UEs 115, respectively, described with reference to FIG. 1. Base station 205 may provide network coverage for a geographic coverage area 210. The base station 205 may transmit DL transmissions to the UEs 215 via communication links 225.

The base station 205 may transmit multicast information to the UEs 215 in a DL transmission scheduled by a DL grant. The base station may additionally indicate in the DL grant UL resources for the UEs 215 to use to transmit NACK feedback.

Each UE 215 in the group of UEs 215 may attempt to decode a message containing the multicast information in the DL transmission. For example, the UE 215-a and the UE 215-b may each determine the message was successfully decoded, and the UE 215-a and the UE 215-b may determine not to transmit NACK feedback to the base station 205. In some examples, the UE 215-c may determine the message was not successfully decoded. The UE 215-c may transmit NACK feedback to the base station 205 in the UL resource indicated in the DL grant to indicate the message was unsuccessfully decoded. In some examples, the UE 215-c may transmit the NACK feedback in a HARQ NACK message, a special bit sequence, a message preamble, or a combination thereof.

Figure 3:
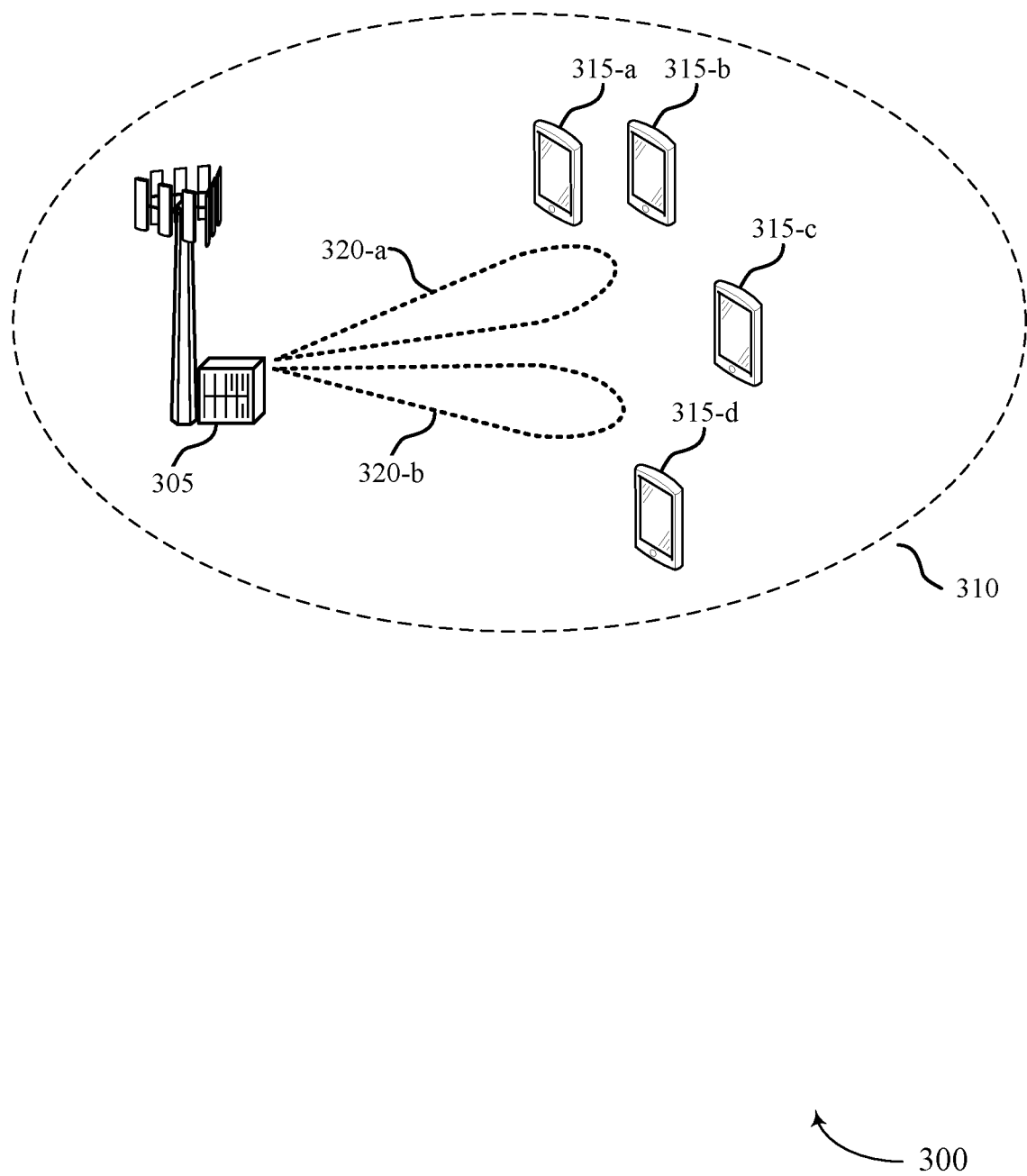

The base station 205 may receive the NACK feedback from the UE 215-c and determine that the base station 205 received NACK feedback from at least one UE 215 in the group of UEs 215. In some examples, the base station 205 may not identify how many or which UEs 215 in the group of UEs 215 transmit NACK feedback. The base station 205 may determine to retransmit the multicast information to the group of UEs 315 in a subsequent DL transmission scheduled by a DL grant based on determining that NACK feedback was received FIG. 3 illustrates an example of a wireless communications system 300 that supports feedback for multicast communications in accordance with aspects of the present disclosure. In some examples, wireless communications system 300 may implement aspects of wireless communication system 100. The wireless communications system 300 may include base station 305 and UEs 315, which may be examples of a base station 105 and UEs 115, respectively, described with reference to FIG. 1. Base station 305 may provide network coverage for a geographic coverage area 310. The base station 305 may transmit DL transmissions to the UEs 315 via DL transmission beams 320 in a beam sweeping procedure.

The base station 305 may transmit multicast information via the DL transmission beams 320 in DL transmissions scheduled by DL grants. In the example illustrated in FIG. 3, a DL transmission beam 320-a is associated with a UE 315-a, a UE 315-b, and a UE 315-c. Further, a DL transmission beam 320-b is associated with the UE 315-c and a UE 315-d. Each DL transmission beam 320 may be associated with additional UEs 315 (not shown). One or more DL grants may schedule one or more DL transmissions via each DL transmission beam 320. Each DL grant may additionally indicate a set of UL resources for the UEs 315 to transmit NACK feedback.

Each UE 315 in the group of UEs 315 may attempt to decode a message containing the multicast information in the DL transmission. In an example, the UEs 315-a, 315-b, and 315-c may determine the message was successfully decoded, and may determine not to transmit NACK feedback to the base station 305. The UE 315-d may determine the message was not successfully decoded. The UE 315-d may transmit NACK feedback to the base station 305 in the UL resource indicated in the DL grant associated with the DL transmission beam 320-b to indicate the message was unsuccessfully decoded. The base station 305 may receive the NACK feedback from the UE 315-d. The base station 305 may determine that the base station 305 received NACK feedback from at least one UE 315 in the group of UEs 315 associated with the DL transmission beam 320-b based on the UL resource in which the base station 305 received the NACK feedback. The base station 305 may determine to retransmit the multicast information via the DL transmission beam 320-b in a subsequent DL transmission scheduled by a DL grant.

The beam sweeping procedure may allow the UE 315-c to receive repetitions of the multicast information via the DL transmission beams. Each DL transmission beam may be associated with a group of UEs, and the UE may belong to multiple groups of UEs. The UE 315-c may receive DL transmissions via multiple DL transmission beams 320-a and 320-b. The UE 315-c may combine the DL transmissions before attempting to decode the message in order to improve decoding reliability. In an example, the UEs 315-a, 315-b, and 315-d may determine the message was successfully decoded, and may determine not to transmit NACK feedback to the base station 305. The UE 315-c may determine the message was not successfully decoded, even after combining the DL transmissions. The UE 315-c may transmit NACK feedback in UL resources associated with one or more of DL transmission beams 320-a and 320-b. In some examples, the UE 315-c may transmit NACK feedback in the UL resources associated with both DL transmission beam 320-a and DL transmission beam 320-b. The base station 305 may determine to retransmit the multicast information via both DL transmission beam 320-a and DL transmission beam 320-b based on receiving NACK feedback in the UL resources. In other examples, the UE 315-c may measure a link quality of UL transmission beams associated with the UL resources. The UE 315-c may transmit NACK feedback in the UL resource associated with the DL transmission beam 320-a based on determining the link quality. The base station 305 may determine to retransmit the multicast information via the DL transmission beam 320-a based on receiving NACK feedback in the associated UL resource.

Figure 4:
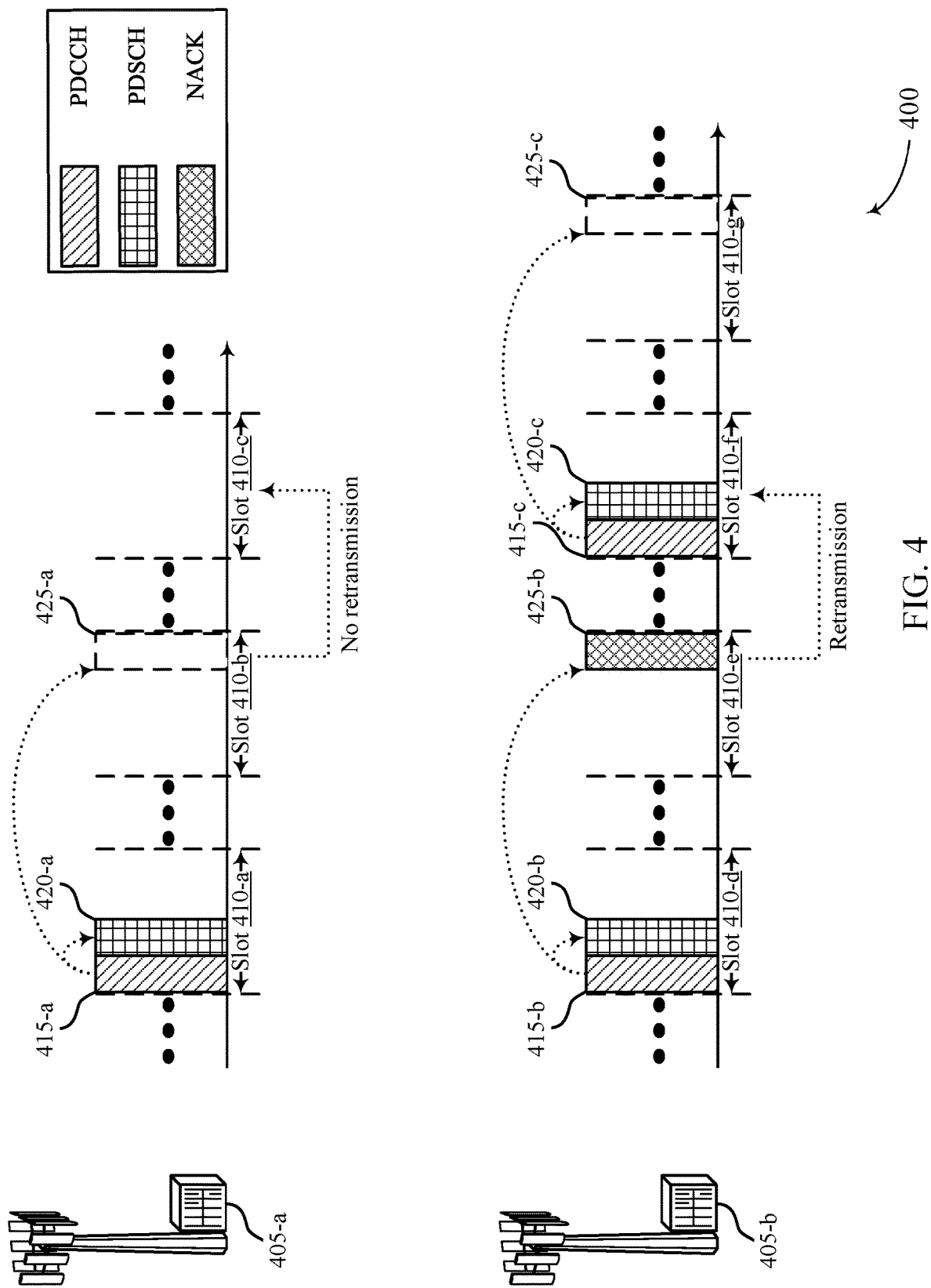
FIGS. 4 and 5 illustrate examples of a transmission timeline that supports feedback for multicast communications in accordance with aspects of the present disclosure.

FIG. 4 illustrates an example of a transmission timeline 400 that supports feedback for multicast communications in accordance with aspects of the present disclosure. In some examples, transmission timeline 400 may implement aspects of wireless communication systems 100 and 200. The transmission timeline 400 may be associated with one or more base stations 405, which may be examples of a base station 105 described with reference to FIG. 1.

A base station 405-a may transmit multicast information to a first group of UEs in a slot 410-a. In some examples, the slot 410-a may be referred to as slot n, where n is the slot index. The base station 405-a may transmit a DL grant in a PDCCH 415-a. The PDCCH 415-a may schedule a DL transmission in a PDSCH 420-a, and may indicate UL resources 425-a for NACK feedback in a slot 410-b. In some examples, the base station 405-a may indicate the UL resources 425-a to the first group of UEs in PUCCH resource indicator in the PDCCH 415-a. In some examples, the slot 410-b may be referred to as slot n+k1, where k1 is a number of slots between the slot containing the multicast information (e.g., the slot 410-a) and the slot containing the UL resources 425-a indicated for NACK feedback (e.g., the slot 410-b). In some examples, the base station 405-a may indicate the number k1 to the first group of UEs in a PDSCH to HARQ feedback timing indicator in the PDCCH 415-a. The base station 405-a may receive no NACK feedback in the UL resources 425-a, and may determine not to retransmit the multicast information in a slot 410-*c*. In some examples, the slot 410-*c* may be referred to as slot n+k1+k3, where k3 is a number of slots between the slot containing the UL resources 425-*a* indicated for NACK feedback (e.g., the slot 410-*b*) and the slot which may be used for retransmitting the multicast information (e.g., slot 410-*c*).

A base station 405-*b* may transmit multicast information to a second group of UEs in a slot 410-*d*. In some examples, the slot 410-*d* may be referred to as slot n. The base station 405-*b* may transmit a DL grant in a PDCCH 415-*b*. The PDCCH 415-*b* may schedule a DL transmission in a PDSCH 420-*b*, and may indicate UL resources 425-*b* for NACK feedback in a slot 410-*e*. In some examples, the base station 405-*b* may indicate the UL resources 425-*b* to the second group of UEs in a PUCCH resource indicator in the PDCCH 415-*b*. In some examples, the slot 410-*e* may be referred to as slot n+k1. In some examples, the base station 405-*b* may indicate the number k1 to the second group of UEs in a PDSCH to HARQ feedback timing indicator in the PDCCH 415-*b*. The base station 405-*b* may receive NACK feedback in the UL resources 425-*b*. In some examples, the base station 405-*b* may receive the NACK feedback in a HARQ NACK message, a special bit sequence, a message preamble, or a combination thereof. The base station 405-*b* may determine to retransmit the multicast information in a slot 410-*f* based on receiving the NACK feedback in the UL resources 425-*b*. In some examples, the slot 410-*f* may be referred to as slot n+k1+k3. The base station 405-*b* may transmit a second DL grant in a PDCCH 415-*c*. The PDCCH 415-*c* may schedule a second DL transmission in a PDSCH 420-*c*, and may indicate UL resources 425-*c* for NACK feedback in a slot 410-*g*. In some examples, the slot 410-*g* may be referred to as slot n+2k1+k3. The base station 405-*b* may receive no NACK feedback in the UL resources 425-*c*, and may determine not to retransmit the multicast information in a subsequent slot 410 (not shown).

Figure 5:
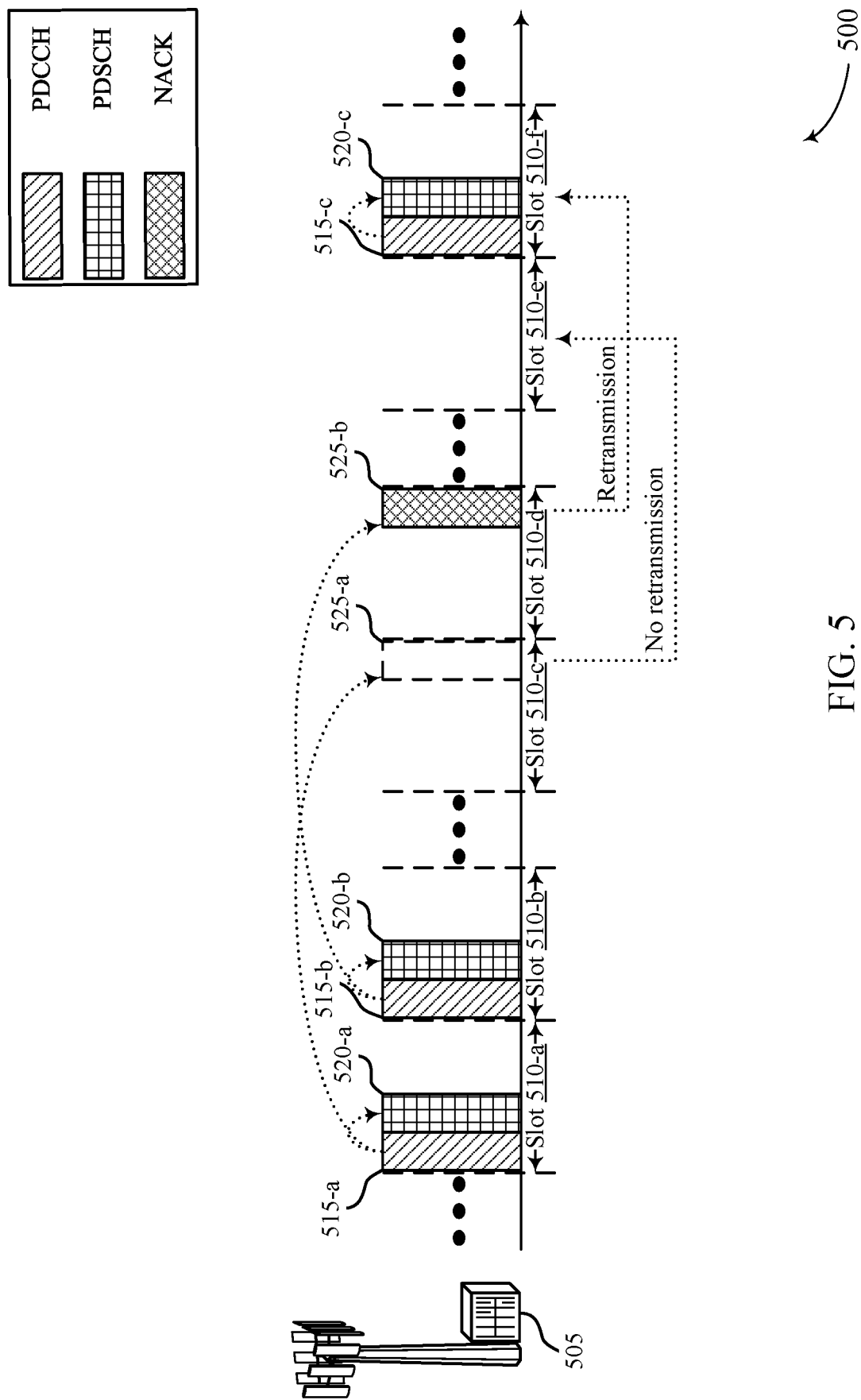

FIG. 5 illustrates an example of a transmission timeline 500 that supports feedback for multicast communications in accordance with aspects of the present disclosure. In some examples, transmission timeline 500 may implement aspects of wireless communication systems 100 and 300. The transmission timeline 500 may be associated with a base station 505, which may be an example of a base station 105 described with reference to FIG. 1.

The base station 505 may transmit multicast information to a first group of UEs in a slot 510-*a* and to a second group of UEs in a slot 510-*b*. The first group of UEs may be associated with a first DL transmission beam, and the second group of UEs may be associated with a second DL transmission beam. In some examples, one or more UEs may belong to the first group of UEs and the second group of UEs. In some examples, the slot 510-*a* may be referred to as slot n, and the slot 510-*b* may be referred to as slot n+1.

The base station 505 may transmit a first DL grant via the first DL transmission beam in a PDCCH 515-*a* and a second DL grant via the second DL transmission beam in a PDCCH 515-*b*. The PDCCH 515-*a* may schedule a first DL transmission in a PDSCH 520-*a*, and may indicate UL resources 525-*a* for NACK feedback in a slot 510-*c*. The PDCCH 515-*b* may schedule a second DL transmission in a PDSCH 520-*b*, and may indicate UL resources 525-*b* for NACK feedback in a slot 510-*d*. In some examples, the base station 505 may indicate the UL resources 525-*b* to the first group of UEs in a PUCCH resource indicator in the PDCCH 515-*a* and to the second group of UEs in a PUCCH resource indicator in the PDCCH 515-*b*. In some examples, the slot 510-*c* may be referred to as slot n+k1, and the slot 510-*d* may be referred to as slot n+k1+1. In some examples, the base station 505 may indicate the number k1 to the first group of UEs in a PDSCH to HARQ feedback timing indicator in the PDCCH 515-*a* and to the second group of UEs in a PDSCH to HARQ feedback timing indicator in the PDCCH 515-*b*.

The base station 505 may receive NACK feedback in the UL resources 525-*b*, but no NACK feedback in the UL resources 525-*a*. In some examples, the base station 505 may receive the NACK feedback in a HARQ NACK message, a special bit sequence, a message preamble, or a combination thereof. The base station 505 may determine not to retransmit the multicast information via the first DL transmission beam in a slot 510-*e* based on the base station 505 not receiving NACK feedback in the UL resources 525-*a*. The base station 505 may additionally determine to retransmit the multicast information via the second DL transmission beam in a slot 510-*f* based on receiving the NACK feedback in the UL resources 525-*b*. In some examples, the slot 510-*e* may be referred to as slot n+k1+k3, and the slot 510-*f* may be referred to as slot n+k1+k3+1. The base station 505 may transmit a third DL grant via the second DL transmission beam in a PDCCH 515-*c*. The PDCCH 515-*c* may schedule a third DL transmission in a PDSCH 520-*c*, and may indicate UL resources for NACK feedback in a subsequent slot (not shown).

Figure 6:
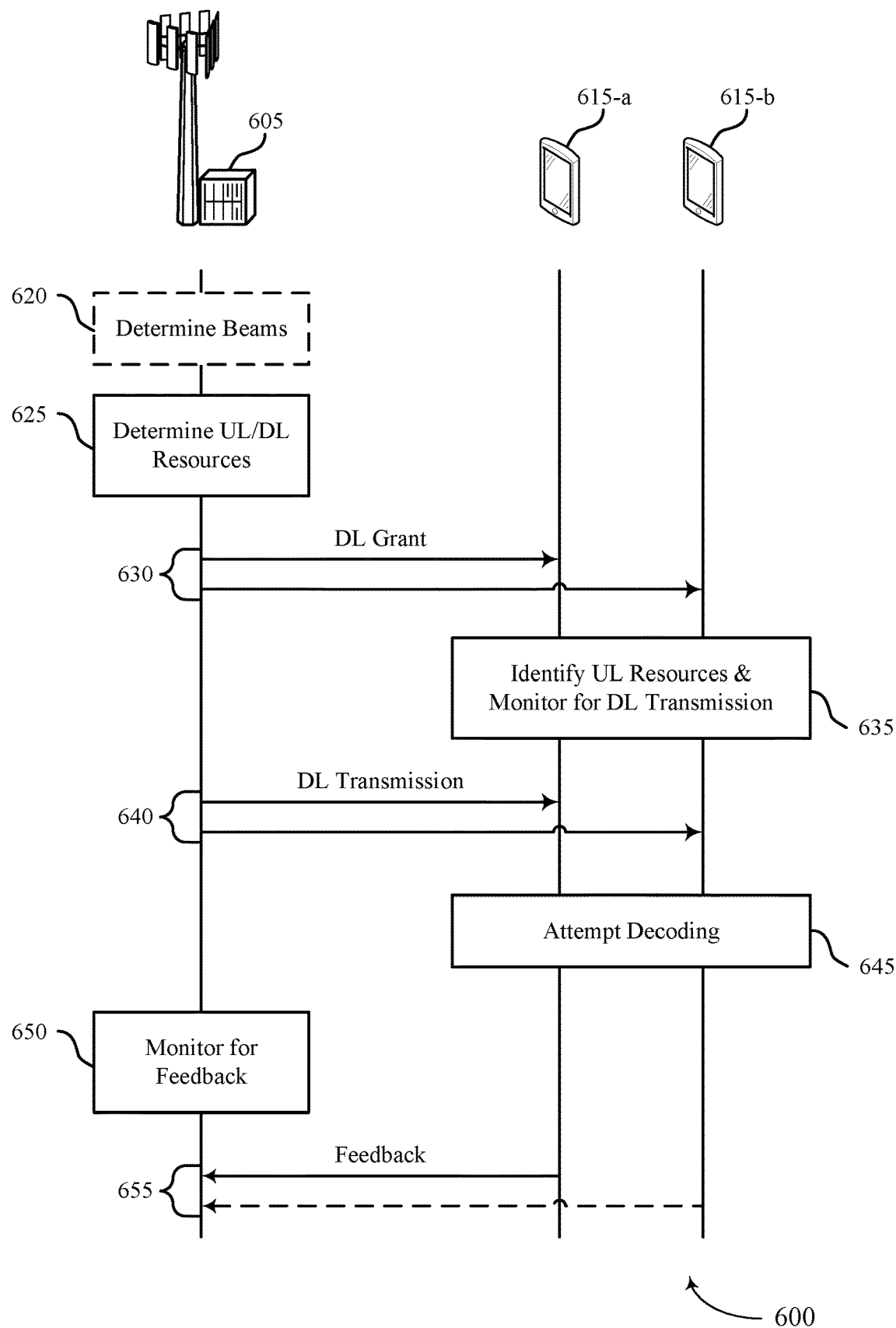
FIG. 6 illustrates an example of a process flow that supports feedback for multicast communications in accordance with aspects of the present disclosure.

FIG. 6 illustrates an example of a process flow 600 that supports feedback for multicast communications in accordance with aspects of the present disclosure. In some examples, process flow 600 may implement aspects of wireless communication systems 100, 200, and 300. The process flow 600 may include a base station 605, a UE 615-*a*, and a UE 615*b*, which may be examples of the corresponding devices described with reference to FIGS. 1 through 5. The base station 605, the UE 615-*a*, and the UE 615*b* may implement one or more techniques for acknowledgment feedback as discussed herein. Alternative examples of the following may be implemented, where some steps are performed in a different order than described or are not performed at all. In some cases, steps may include additional features not mentioned below, or further steps may be added At 620, the base station 605 may in some examples determine a set of DL transmission beams as part of a beam sweeping procedure. The base station 605 may configure at least a first DL transmission beam for transmitting DL resources to the UE 615-*a* and the UE 615-*b*. In some examples, the base station 605 may additionally configure additional DL transmission beams for transmitting DL resources to one or both of the UE 615-*a* and the UE 615-*b*.

At 625, the base station 605 may determine DL and UL resources for multicast communication with the UEs 615. The base station 605 may determine a set of DL resources for a DL transmission including the multicast information to the UEs 615. In some examples, the DL resources may include a PUSCH. The base station 605 may additionally determine a set of UL resources for NACK feedback information corresponding to the DL transmission. In some examples, the set of UL resources may be included in a PUCCH, a PUSCH, a RACH, or other resources inside or outside a system bandwidth, or a combination thereof. In some examples, the base station 605 may additionally determine additional DL resources for transmission via the additional DL transmission beams, as well as corresponding UL resources for additional DL transmissions in the additional DL resources.

At 630, the base station may transmit a DL grant to the UEs 615. The DL grant may indicate to the UEs 615 the set of DL resources for the DL transmission including the multicast information. The DL grant may additionally indicate the set of UL resources for the UEs 615 to use for NACK feedback corresponding to the DL transmission. Each UE 615 in the group of UEs 615 may be directed to use UL resources in the set of UL resources, and the UL resources for each UE 615 may at least partially overlap.

In some examples, the base station 605 may transmit the DL grant via the first DL transmission beam configured for the UE 615-*a* and the UE 615-*b*. In some examples, the base station 605 may transmit additional DL grants via the additional DL transmission beams. Each additional DL grant may indicate a respective set of DL resources for an additional DL transmission, as well as a respective set of UL resources for NACK feedback.

At 635, the UEs 615 may each identify the set of UL resources for transmitting NACK feedback based on the indication in the DL grant. In some examples, the UEs 615 may additionally identify the respective set of UL resources indicated in each additional DL grant received by the additional DL transmission beams. In some examples, the UEs 615 may identify a UL transmission beam for transmitting the NACK feedback to the base station 605.

The UEs 615 may additionally monitor the set of DL resources indicated in the DL grant for the DL transmission including the multicast information. In some examples, the UEs 615 may additionally monitor the respective set of DL resources for the additional DL transmission indicated in each additional DL grant.

At 645, each UE 615 may attempt to decode a message containing the multicast information in the DL transmission. In some examples, the UE 615-*a* may determine whether the message was successfully decoded based on whether a CRC of the message passes or fails, in which the UE 615-*a* may detect errors in decoding the message based on calculating a number of checksum bits following the message. If the UE 615-*a* determines the message was successfully decoded (e.g., the CRC passes), the UE 615-*a* may determine to send no feedback to the base station. If the UE 615-*a* determines the message was not successfully decoded (e.g., the CRC fails), the UE 615-*a* may determine to transmit NACK feedback to the base station 605 to indicate the message was unsuccessfully decoded.

In some examples, the beam sweeping procedure may allow the UE 615-*a* to receive repetitions of the multicast information from the base station 605 via multiple DL transmission beams. The UE 615-*a* may combine the DL transmissions before attempting to decode the message in order to improve decoding reliability. If the UE 615-*a* does not successfully decode the message, even after combining, the UE 615-*a* may determine to transmit NACK feedback in UL resources indicated by one or more of the DL grants.

At 650, the base station 605 may monitor the determined set of UL resources for NACK feedback information corresponding to the DL transmission. In some examples, the base station 605 may additionally monitor the UL resources corresponding to the additional DL transmissions transmitted via the additional DL transmission beams.

At 655, the UE 615-*a* may transmit NACK feedback to the base station 605. In some examples, the UE 615-*a* may transmit NACK feedback based on an SFN configuration. In some examples, the UE 615-*a* may transmit the NACK feedback in a HARQ NACK message, a special bit sequence, a message preamble, or a combination thereof. The group of UEs 615 may transmit NACK feedback using a common waveform, a common sequence, a common resource mapping, or a combination thereof. In some examples, such as when the UE 615-*a* receives multiple DL grants via multiple DL transmission beams, the UE 615-*a* may transmit NACK feedback in UL resources indicated by one or more of the DL grants. In some examples, the UE 615-*a* may transmit NACK feedback in UL resources indicated by multiple DL grants received via multiple DL transmission beams. In other examples, the UE 615-*a* may transmit NACK feedback in the set of UL resources indicated by the DL grant transmitted via the first DL transmission beam. The UE may determine to transmit the NACK feedback in the set of UL resources based on measuring a link quality of a set of UL transmission beams.

The base station may determine that the NACK feedback was received from at least one UE 615 in the group of UEs 615 and may not identify how many or which UEs 615 in the group of UEs 615 transmitted NACK feedback. In some examples, the base station 605 may also receive NACK feedback from the UE 615-*b* based on whether the UE 615-*b* successfully decoded the message in the DL transmission. Based on receiving the NACK feedback, the base station 605 may determine to retransmit the multicast information to the group of UEs 615 in a subsequent DL transmission scheduled by a DL grant. In some examples, the base station 605 may determine to retransmit the multicast information in DL resources via DL transmission beams that correspond to the UL resources in which NACK feedback is received.

Figure 7:
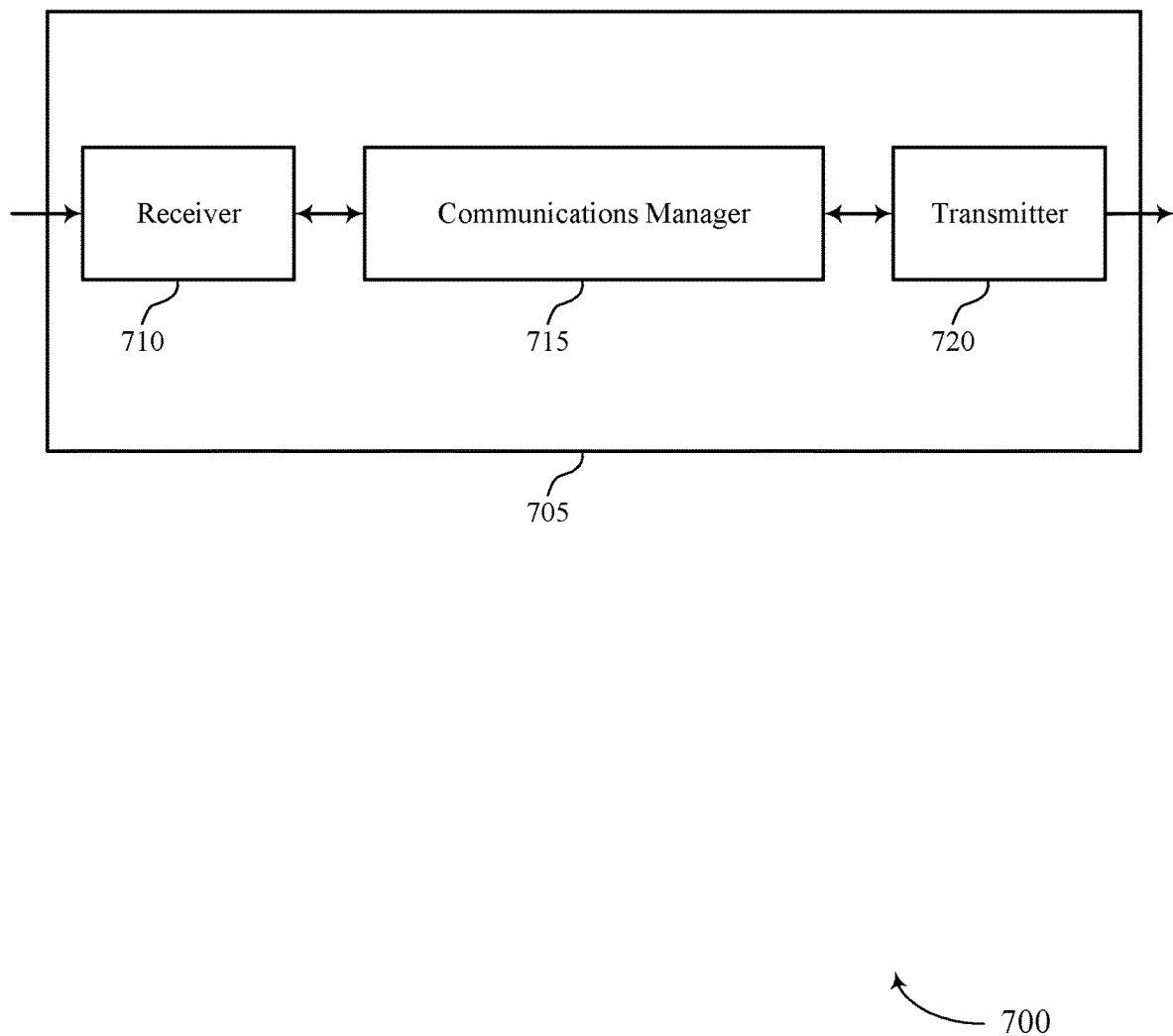
FIGS. 7 and 8 show block diagrams of devices that support feedback for multicast communications in accordance with aspects of the present disclosure.

FIG. 7 shows a block diagram 700 of a device 705 that supports feedback for multicast communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to feedback for multicast communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a DL grant that indicates a set of DL resources for a DL transmission to a set of UEs including the UE, identify a set of UL resources for negative acknowledgment feedback information corresponding to the DL transmission based on the DL grant, monitor the set of DL resources for the DL transmission from the base station, and transmit a feedback message to the base station via the set of UL resources based on the monitoring, where the feedback message indicates that reception of the DL transmission was unsuccessful. The actions performed by the communications manager 715 as described herein may be implemented to realize one or more potential advantages. One implementation may allow a UE 115 to save power and increase battery life by communicating with a base station 105 more efficiently. For example, a UE 115 may more efficiently obtain information transmitted by a base station 105 in a multicast message, as the UE 115 may be able to combine multiple multicast transmissions (e.g., in a multi-beam transmission scenario) or may be able to provide feedback if the multicast transmission was not successfully received at the UE 115. In such cases, the UE 115 may increase the likelihood of a successful decoding procedure of the multicast information through the combination of multiple multicast transmission or one or more retransmissions of the multicast information (e.g., in response to the UE 115 providing NACK feedback). Another implementation may provide improved quality and reliability of service at the UE 115, as latency and the number of separate resources allocated to a group of UEs including the UE 115 may be reduced. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 705 and transmitter 720 may be implemented as analog components (e.g., amplifiers, filters, antennas, etc.) coupled with the mobile device modem to enable wireless transmission and reception over one or more bands.

Figure 8:
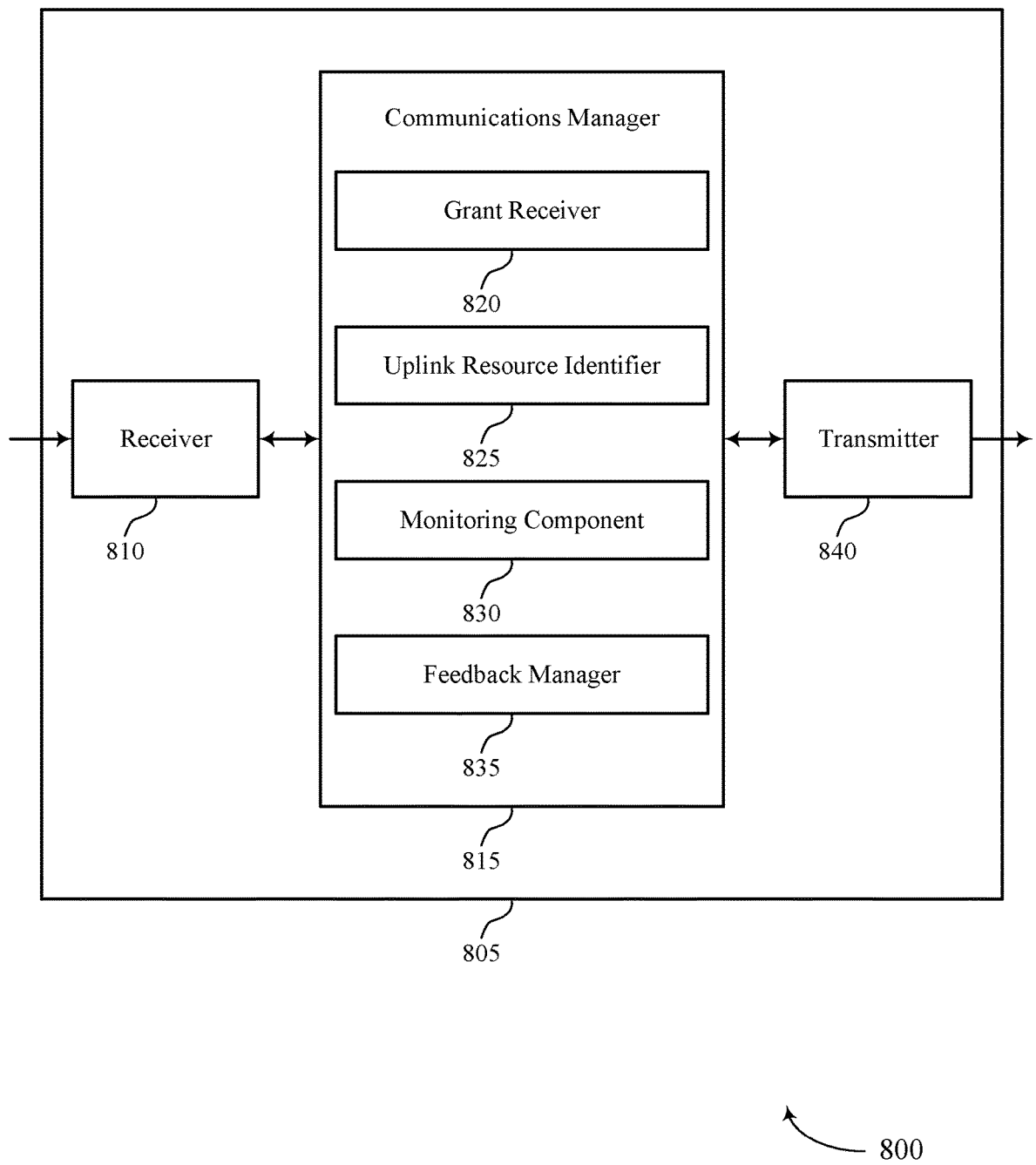

FIG. 8 shows a block diagram 800 of a device 805 that supports feedback for multicast communications in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to feedback for multicast communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a grant receiver 820, an uplink resource identifier 825, a monitoring component 830, and a feedback manager 835. The communications manager 815 may be an example of aspects of the communications manager 1010 described herein.

The grant receiver 820 may receive, from a base station, a DL grant that indicates a set of DL resources for a DL transmission to a set of UEs including the UE.

The uplink resource identifier 825 may identify a set of UL resources for negative acknowledgment feedback information corresponding to the DL transmission based on the DL grant.

The monitoring component 830 may monitor the set of DL resources for the DL transmission from the base station.

The feedback manager 835 may transmit a feedback message to the base station via the set of UL resources based on the monitoring, where the feedback message indicates that reception of the DL transmission was unsuccessful.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
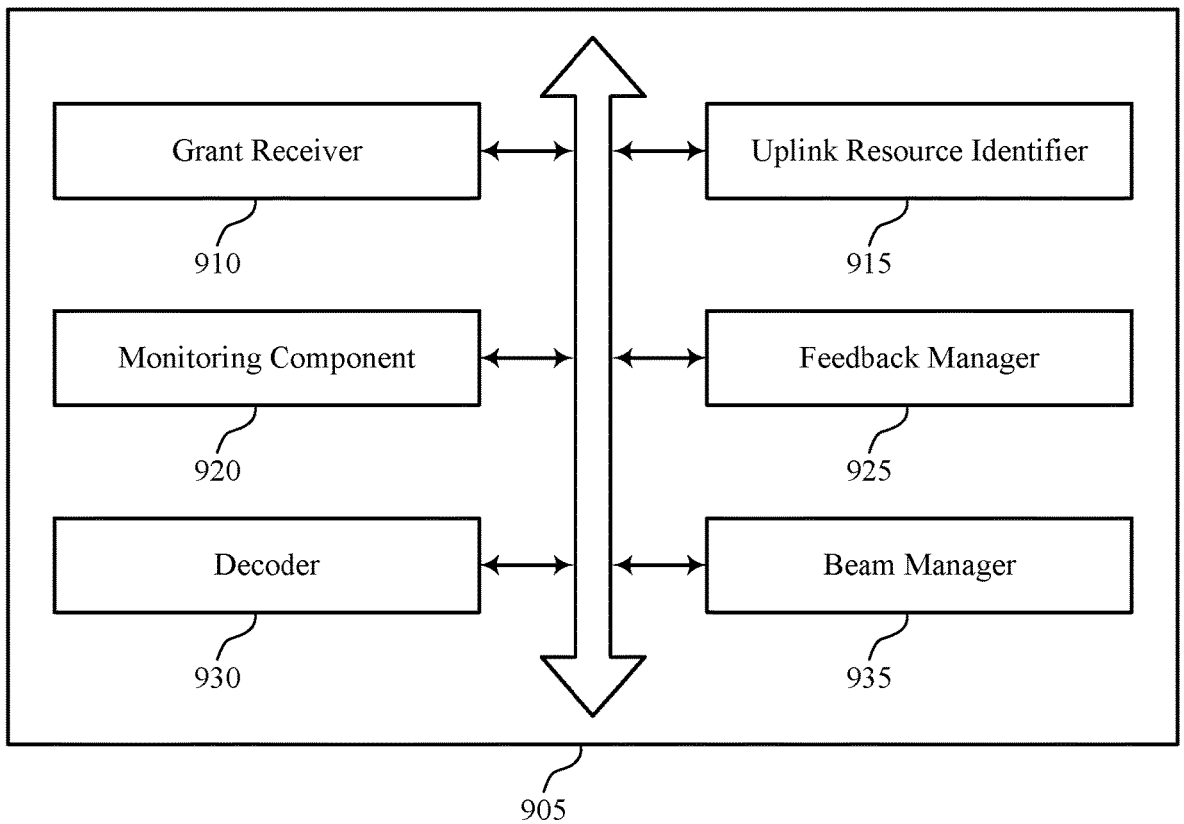
FIG. 9 shows a block diagram of a communications manager that supports feedback for multicast communications in accordance with aspects of the present disclosure.

FIG. 9 shows a block diagram 900 of a communications manager 905 that supports feedback for multicast communications in accordance with aspects of the present disclosure. The communications manager 905 may be an example of aspects of a communications manager 715, a communications manager 815, or a communications manager 1010 described herein. The communications manager 905 may include a grant receiver 910, an uplink resource identifier 915, a monitoring component 920, a feedback manager 925, a decoder 930, and a beam manager 935. Each of these modules may communicate, directly or indirectly, with one another (e.g., via one or more buses).

The grant receiver 910 may receive, from a base station, a DL grant that indicates a set of DL resources for a DL transmission to a set of UEs including the UE. In some examples, the grant receiver 910 may receive the DL grant via a DL transmission beam configured for the set of UEs. In some examples, the grant receiver 910 may receive one or more additional DL grants via respective DL transmission beams, where each additional DL grant indicates a respective additional set of DL resources for the DL transmission. In some examples, the grant receiver 910 may receive, from the base station, a second DL grant that indicates a second set of DL resources for a retransmission of the DL transmission to the UE in response to the feedback message. In some examples, the grant receiver 910 may receive the DL grant via a PDCCH. In some cases, the DL grant includes a UL resource indicator or a feedback timing indicator that indicates the set of UL resources. In some cases, the UL resource indicator includes a PUCCH resource indicator. In some cases, the feedback timing indicator includes a PDSCH to HARQ feedback timing indicator. In some cases, the UL resource indicator and/or the feedback timing indicator is included in DCI containing the DL grant.

The uplink resource identifier 915 may identify a set of UL resources for negative acknowledgment feedback information corresponding to the DL transmission based on the DL grant. In some examples, the uplink resource identifier 915 may identify additional sets of UL resources for negative acknowledgment feedback information corresponding to the DL transmission based on the one or more additional DL grants. In some cases, the set of UL resources includes a PUCCH, a PUSCH, a RACH, UL resources within a system bandwidth, UL resources outside the system bandwidth, or any combination thereof.

The monitoring component 920 may monitor the set of DL resources for the DL transmission from the base station. In some examples, the monitoring component 920 may monitor the additional sets of DL resources for the DL transmission from the base station. In some examples, the monitoring component 920 may monitor the second set of DL resources for the retransmission of the DL transmission. In some examples, the monitoring component 920 may monitor a PDSCH for the DL transmission.

The feedback manager 925 may transmit a feedback message to the base station via the set of UL resources based on the monitoring, where the feedback message indicates that reception of the DL transmission was unsuccessful. In some examples, the feedback manager 925 may transmit an additional feedback message to the base station via a respective set of UL resources based on monitoring the additional sets of DL resources, where the additional feedback message indicates that reception of the DL transmission was unsuccessful. In some examples, the feedback manager 925 may transmit a set of feedback messages including the feedback message over respective sets of UL resources for negative acknowledgment feedback information.

In some examples, the feedback manager 925 may transmit the feedback message via at least one of the set of UL transmission beams based on the link quality. In some examples, the feedback manager 925 may transmit the feedback message based on determining that the decoding procedure for the DL transmission was unsuccessful. In some examples, the feedback manager 925 may transmit, based on monitoring the second set of DL resources, a second feedback message to the base station via a second set of UL resources for negative acknowledgment feedback information indicated by the second DL grant, where the feedback message indicates that reception of the retransmission was unsuccessful. In some cases, the feedback message includes a HARQ NACK message, a bit sequence, a message preamble, or a combination thereof.

The decoder 930 may combine information received via the additional sets of DL resources based on the monitoring. In some examples, the decoder 930 may determine that reception of the DL transmission was unsuccessful based on the combining. In some examples, the decoder 930 may determine that a decoding procedure for the DL transmission was unsuccessful based on the monitoring.

The beam manager 935 may measure a link quality of a set of UL transmission beams configured for communications with the base station.

Figure 10:
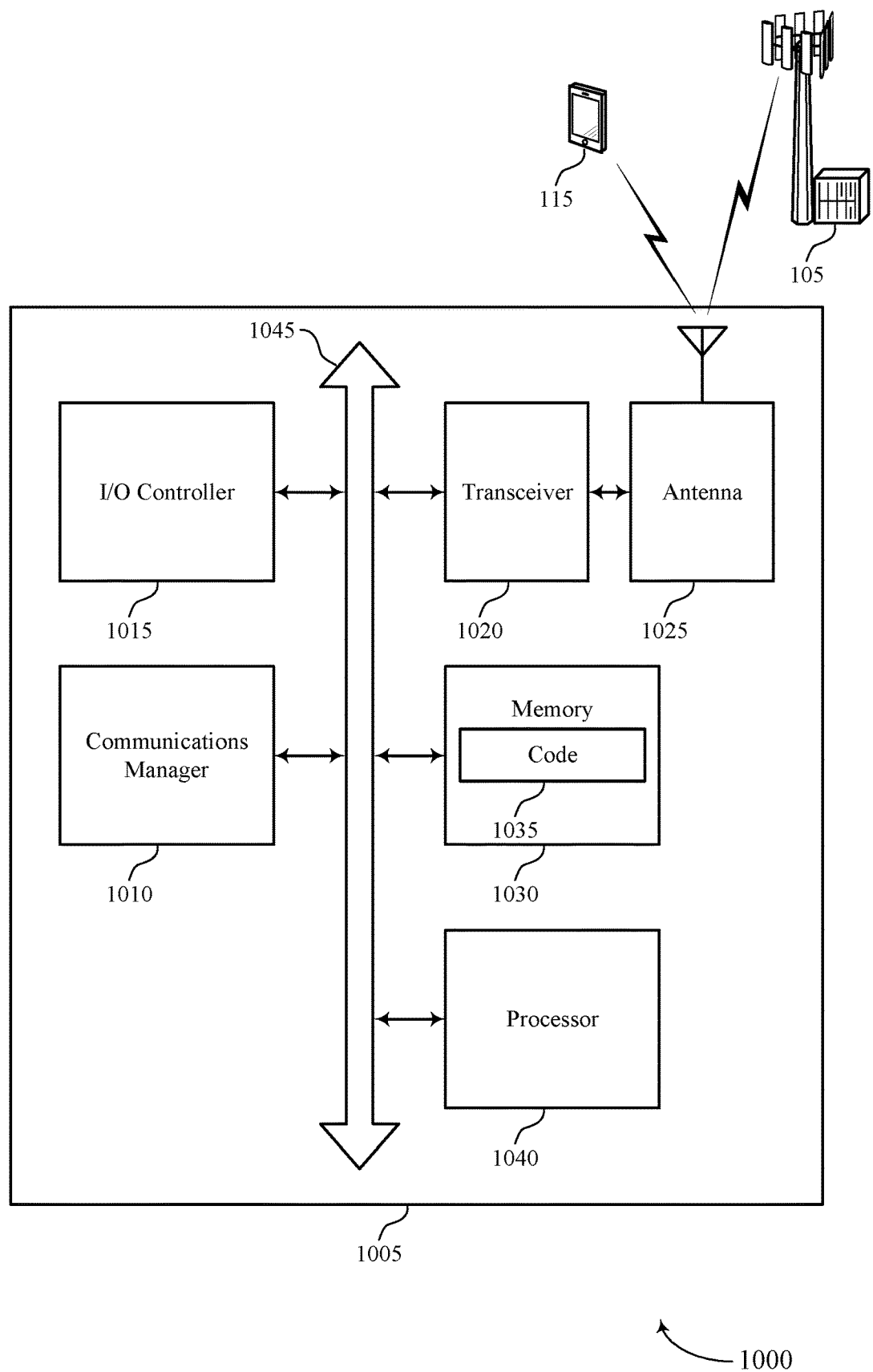
FIG. 10 shows a diagram of a system including a device that supports feedback for multicast communications in accordance with aspects of the present disclosure.

FIG. 10 shows a diagram of a system 1000 including a device 1005 that supports feedback for multicast communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a DL grant that indicates a set of DL resources for a DL transmission to a set of UEs including the UE, identify a set of UL resources for negative acknowledgment feedback information corresponding to the DL transmission based on the DL grant, monitor the set of DL resources for the DL transmission from the base station, and transmit a feedback message to the base station via the set of UL resources based on the monitoring, where the feedback message indicates that reception of the DL transmission was unsuccessful.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the device 1005 may include a single antenna 1025, or the device 1005 may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting feedback for multicast communications).

Based on determining NACK feedback for multicast transmissions, a processor of a UE 115 (e.g., controlling the receiver 710, the transmitter 720, or the transceiver 1020)

may reliably obtain multicast information. Further, the processor of UE 115 may transmit the NACK feedback and monitor for subsequent DL transmissions. The processor of the UE 115 may turn on one or more processing units for monitoring the subsequent DL transmissions, increase a processing clock, or a similar mechanism within the UE 115. As such, when the subsequent DL transmission is received, the processor may be ready to respond more efficiently through the reduction of a ramp up in processing power.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
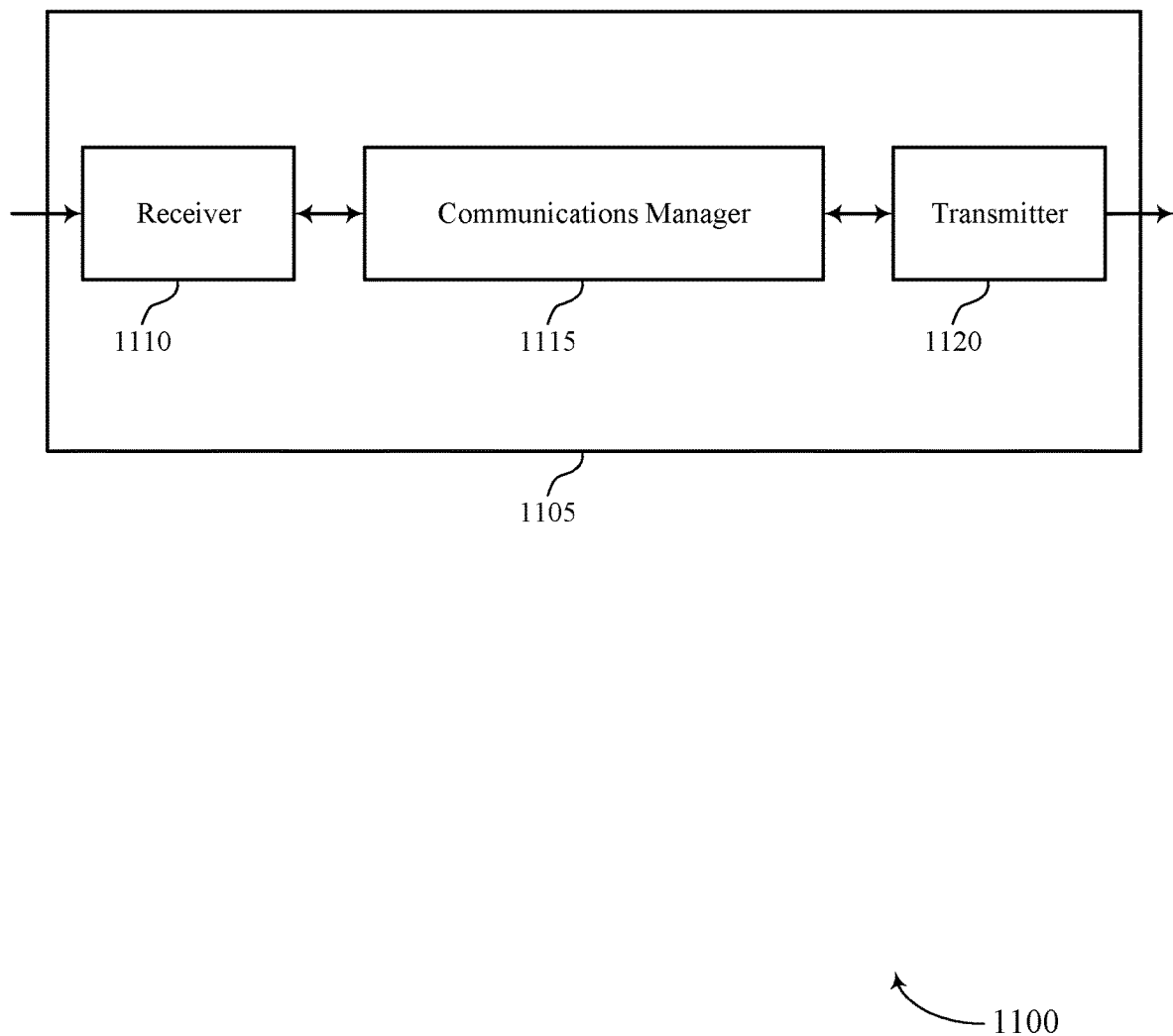
FIGS. 11 and 12 show block diagrams of devices that support feedback for multicast communications in accordance with aspects of the present disclosure.

FIG. 11 shows a block diagram 1100 of a device 1105 that supports feedback for multicast communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback for multicast communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine a set of DL resources for a DL transmission to a set of UEs, determine a set of UL resources for negative acknowledgment feedback information corresponding to the DL transmission, transmit, to the set of UEs, a DL grant indicating the set of DL resources for the DL transmission and the set of UL resources for negative acknowledgment feedback information corresponding to the DL transmission, and monitor the set of UL resources for a feedback message from at least one UE of the set of UEs, where the feedback message indicates that reception of the DL transmission at the at least one UE was unsuccessful. The actions performed by the communications manager 1115 as described herein may be implemented to realize one or more potential advantages. One implementation may allow a base station 105 to reduce system overhead by processing only NACK feedback from one or more UEs 115 supported by the base station. In such cases, the base station 105 may perform retransmission of the multicast information to the one or more UEs 115, which may allow the multicast information to be obtained at the one or more UEs 115 more efficiently. Another implementation may provide improved quality and reliability of service at the base station 105 by ensuring that multicast information is more reliably obtained at a UE 115. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
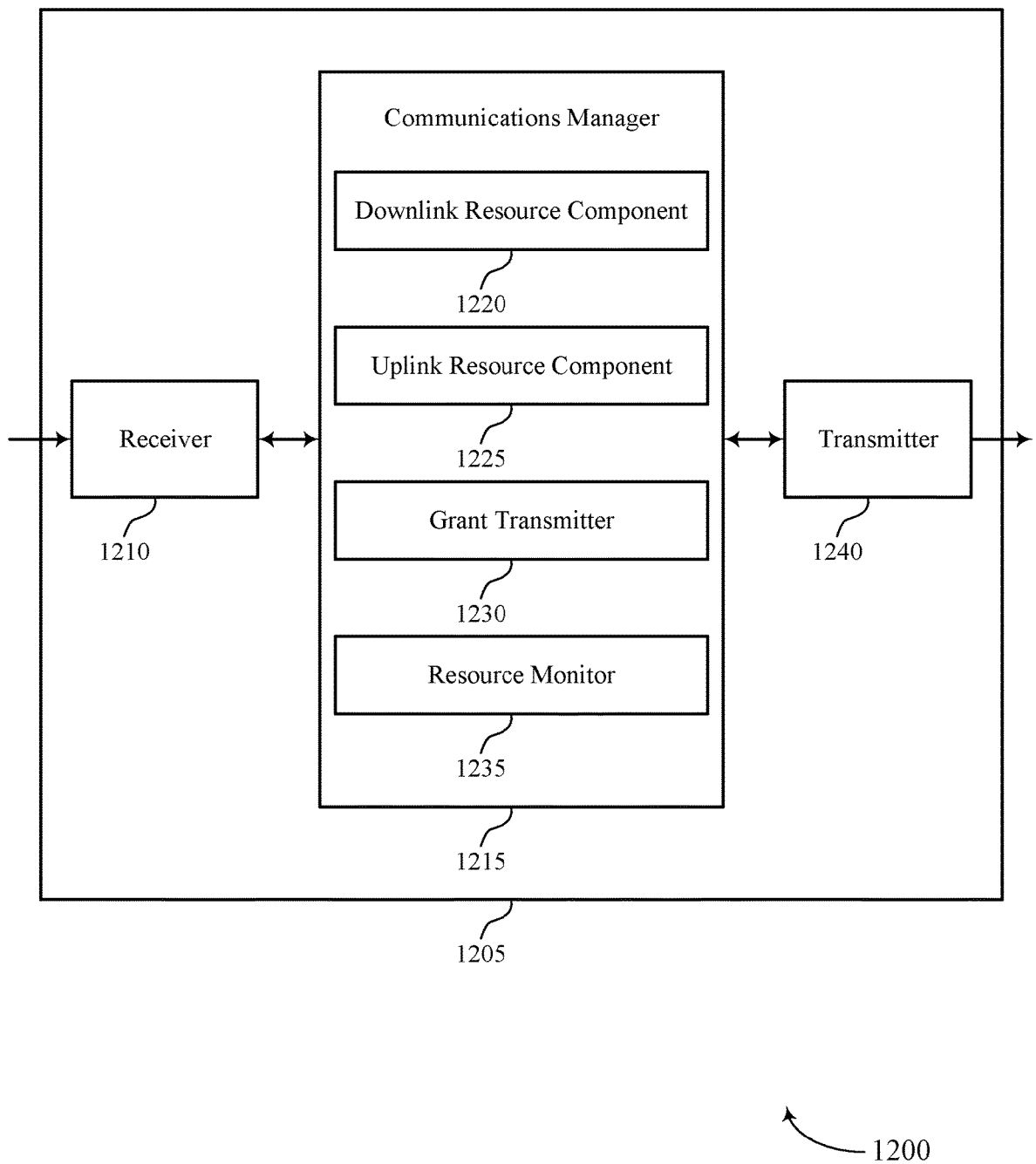

FIG. 12 shows a block diagram 1200 of a device 1205 that supports feedback for multicast communications in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to feedback for multicast communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a downlink resource component 1220, an uplink resource component 1225, a grant transmitter 1230, and a resource monitor 1235. The communications manager 1215 may be an example of aspects of the communications manager 1410 described herein.

The downlink resource component 1220 may determine a set of DL resources for a DL transmission to a set of UEs.

The uplink resource component 1225 may determine a set of UL resources for negative acknowledgment feedback information corresponding to the DL transmission.

The grant transmitter 1230 may transmit, to the set of UEs, a DL grant indicating the set of DL resources for the DL transmission and the set of UL resources for negative acknowledgment feedback information corresponding to the DL transmission.

The resource monitor 1235 may monitor the set of UL resources for a feedback message from at least one UE of the set of UEs, where the feedback message indicates that reception of the DL transmission at the at least one UE was unsuccessful.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
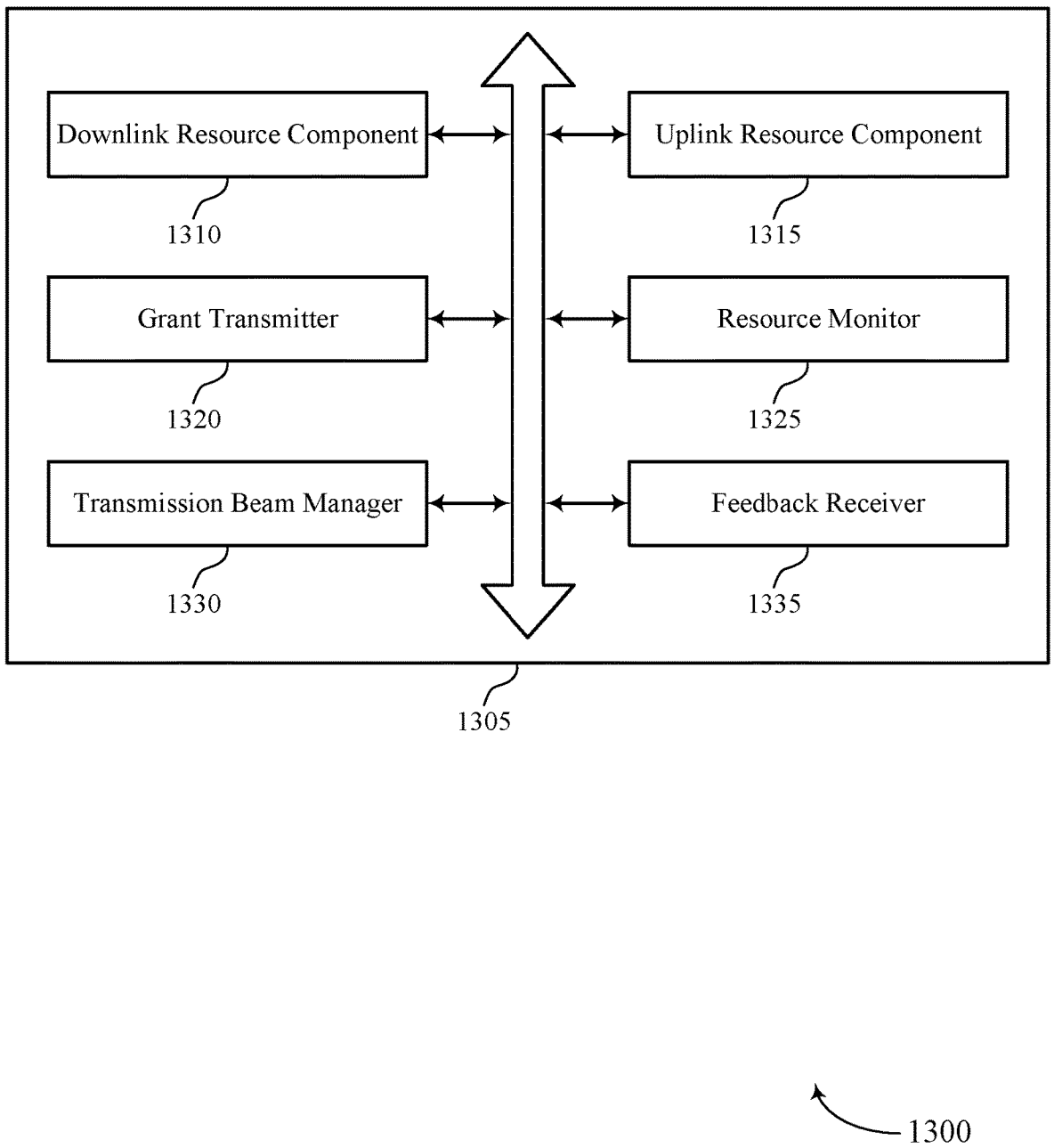
FIG. 13 shows a block diagram of a communications manager that supports feedback for multicast communications in accordance with aspects of the present disclosure.

FIG. 13 shows a block diagram 1300 of a communications manager 1305 that supports feedback for multicast communications in accordance with aspects of the present disclosure. The communications manager 1305 may be an example of aspects of a communications manager 1115, a communications manager 1215, or a communications manager 1410 described herein. The communications manager 1305 may include a downlink resource component 1310, an uplink resource component 1315, a grant transmitter 1320, a resource monitor 1325, a transmission beam manager 1330, and a feedback receiver 1335. Each of these modules may communicate, directly or indirectly, with one another (e.g., via one or more buses).

The downlink resource component 1310 may determine a set of DL resources for a DL transmission to a set of UEs. In some examples, the downlink resource component 1310 may transmit the DL transmission in a PDSCH.

The uplink resource component 1315 may determine a set of UL resources for negative acknowledgment feedback information corresponding to the DL transmission. In some examples, the uplink resource component 1315 may determine respective sets of UL resources for each UE of the set of UEs for negative acknowledgment feedback information corresponding to the DL transmission, where the DL grant indicates the respective sets of UL resources. In some examples, the uplink resource component 1315 may determine a common sequence and a common time and frequency resource mapping for the set of UEs. In some examples, the uplink resource component 1315 may transmit an indication of the common sequence and the common time and frequency resource mapping to the set of UEs. In some cases, the set of UL resources includes a PUCCH, a PUSCH, a RACH, UL resources within a system bandwidth, UL resources outside the system bandwidth, or any combination thereof. In some cases, at least two of the respective sets of UL resources at least partially overlap.

The grant transmitter 1320 may transmit, to the set of UEs, a DL grant indicating the set of DL resources for the DL transmission and the set of UL resources for negative acknowledgment feedback information corresponding to the DL transmission. In some examples, the grant transmitter 1320 may transmit the DL grant to the set of UEs via one or more DL transmission beams of the set of DL transmission beams. In some examples, the grant transmitter 1320 may transmit one or more additional DL grants via respective DL transmissions beams, where each additional DL grant indicates a respective set of DL resources for the DL transmission and a respective set of UL resources for negative acknowledgment feedback information corresponding to the DL transmission.

In some examples, the grant transmitter 1320 may transmit, to the set of UEs, a second DL grant that indicates a second set of DL resources for a retransmission of the DL transmission in response to the feedback message and a second set of UL resources for negative acknowledgment feedback information corresponding to the retransmission. In some examples, the grant transmitter 1320 may transmit the second DL grant via the DL transmission beam and the DL resources. In some examples, the grant transmitter 1320 may transmit DCI to the set of UEs, the DCI including the feedback timing indicator. In some examples, the grant transmitter 1320 may transmit the DL grant in a PDCCH. In some cases, the DL grant includes a UL resource indicator and/or a feedback timing indicator that indicates the set of UL resources. In some cases, the UL resource indicator includes a PUCCH resource indicator. In some cases, the feedback timing indicator includes a PDSCH to HARQ feedback timing indicator.

The resource monitor 1325 may monitor the set of UL resources for a feedback message from at least one UE of the set of UEs, where the feedback message indicates that reception of the DL transmission at the at least one UE was unsuccessful. In some examples, the resource monitor 1325 may monitor the respective sets of UL resources for the feedback message from the at least one UE, where the feedback message indicate that reception of the DL transmission at the at least one UE via the one or more DL transmission beams was unsuccessful. In some cases, the feedback message includes a NACK message.

The transmission beam manager 1330 may determine a set of DL transmission beams configured for the set of UEs. In some examples, the transmission beam manager 1330 may identify a DL transmission beam and DL resources corresponding to UL resources over which the feedback message from the at least one UE is received.

The feedback receiver 1335 may receive the feedback message from the at least one UE based on monitoring the set of UL resources.

Figure 14:
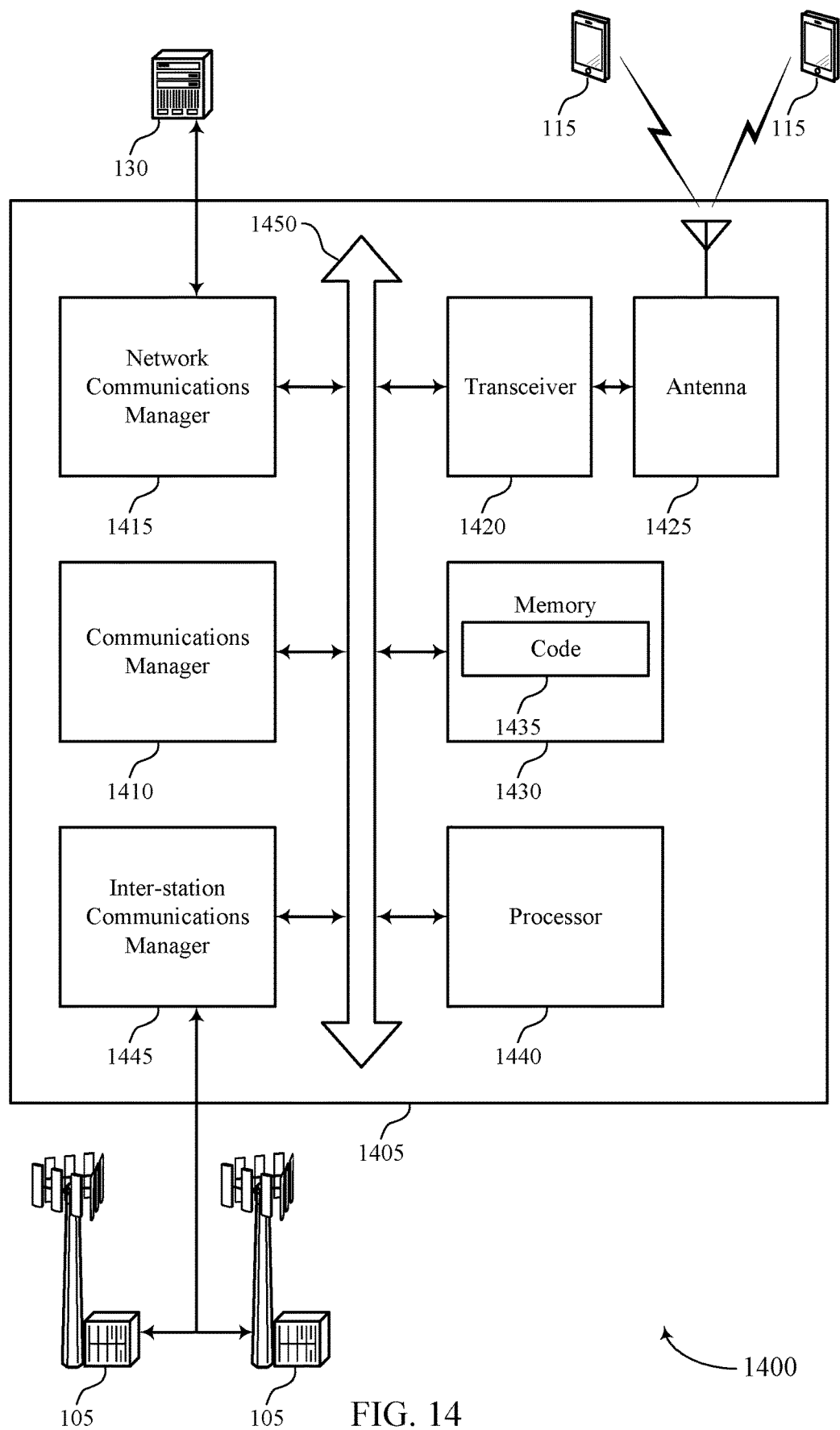
FIG. 14 shows a diagram of a system including a device that supports feedback for multicast communications in accordance with aspects of the present disclosure.

FIG. 14 shows a diagram of a system 1400 including a device 1405 that supports feedback for multicast communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine a set of DL resources for a DL transmission to a set of UEs, determine a set of UL resources for negative acknowledgment feedback information corresponding to the DL transmission, transmit, to the set of UEs, a DL grant indicating the set of DL resources for the DL transmission and the set of UL resources for negative acknowledgment feedback information corresponding to the DL transmission, and monitor the set of UL resources for a feedback message from at least one UE of the set of UEs, where the feedback message indicates that reception of the DL transmission at the at least one UE was unsuccessful.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting feedback for multicast communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
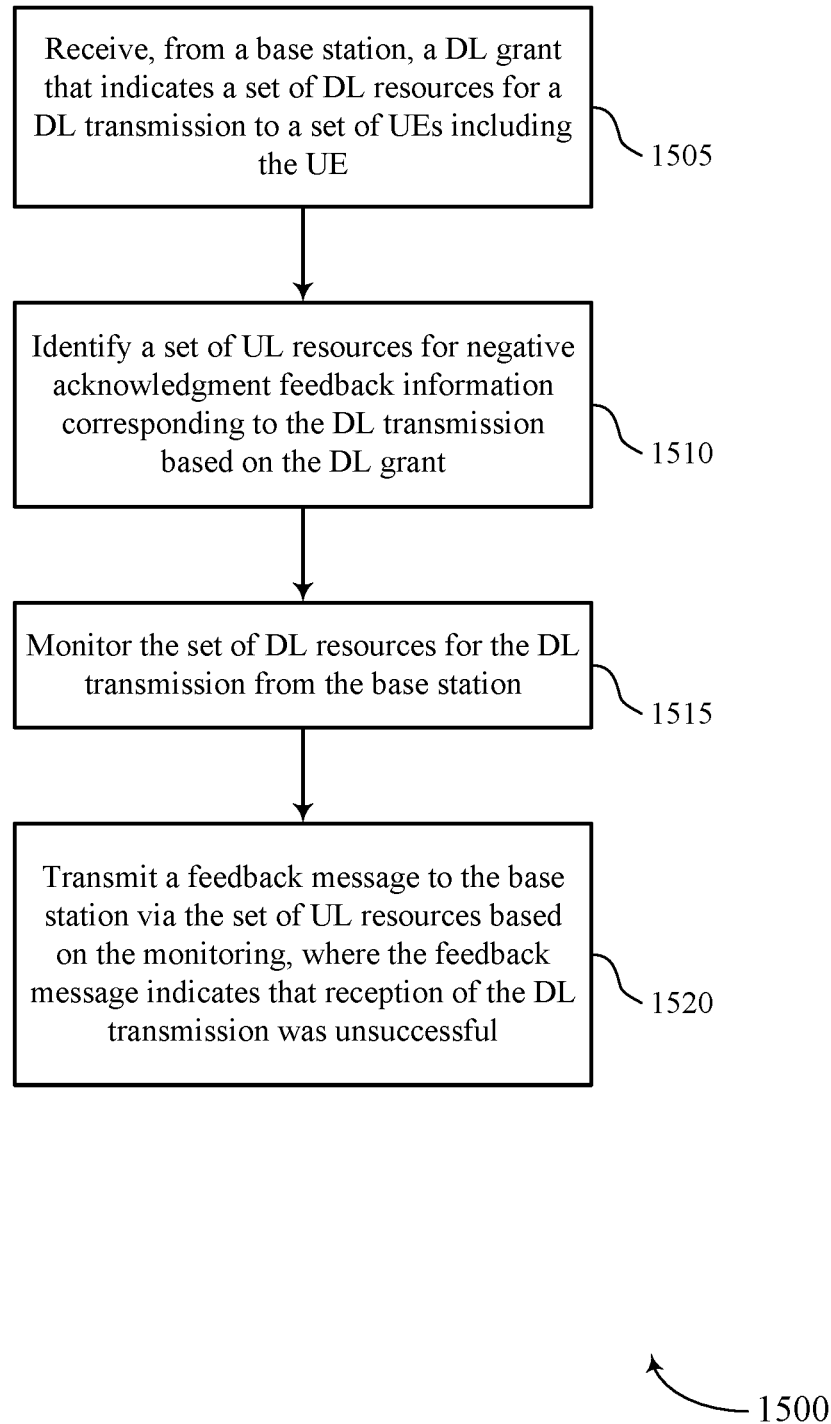
FIGS. 15 through 21 show flowcharts illustrating methods that support feedback for multicast communications in accordance with aspects of the present disclosure.

FIG. 15 shows a flowchart illustrating a method 1500 that supports feedback for multicast communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a DL grant that indicates a set of DL resources for a DL transmission to a set of UEs including the UE. The operations of 1505 may be performed according to the methods described herein. In some examples, aspects of the operations of 1505 may be performed by a grant receiver as described with reference to FIGS. 7 through 10.

At 1510, the UE may identify a set of UL resources for negative acknowledgment feedback information corresponding to the DL transmission based on the DL grant. The operations of 1510 may be performed according to the methods described herein. In some examples, aspects of the operations of 1510 may be performed by an uplink resource identifier as described with reference to FIGS. 7 through 10.

At 1515, the UE may monitor the set of DL resources for the DL transmission from the base station. The operations of 1515 may be performed according to the methods described herein. In some examples, aspects of the operations of 1515 may be performed by a monitoring component as described with reference to FIGS. 7 through 10.

At 1520, the UE may transmit a feedback message to the base station via the set of UL resources based on the monitoring, where the feedback message indicates that reception of the DL transmission was unsuccessful. The operations of 1520 may be performed according to the methods described herein. In some examples, aspects of the operations of 1520 may be performed by a feedback manager as described with reference to FIGS. 7 through 10.

Figure 16:
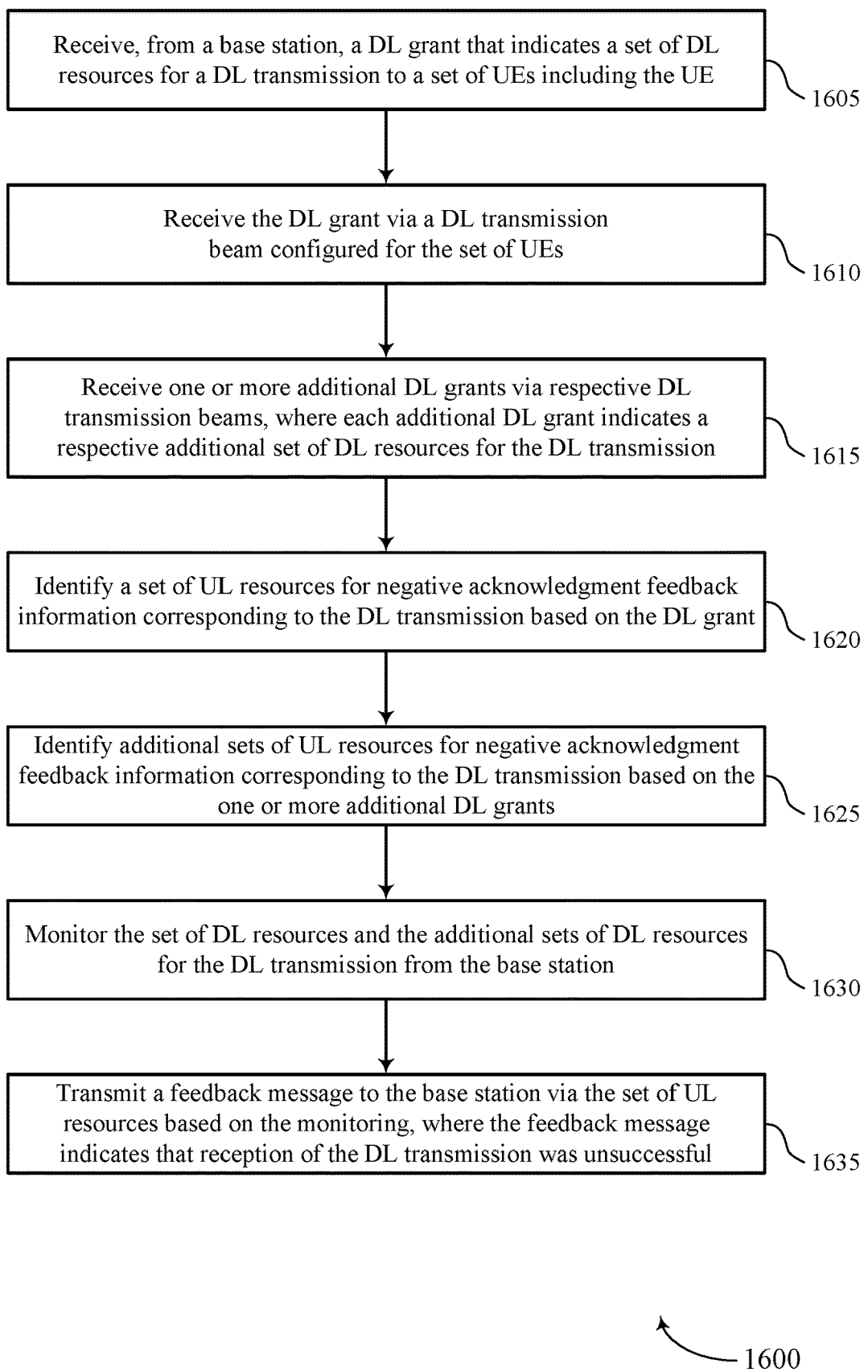

FIG. 16 shows a flowchart illustrating a method 1600 that supports feedback for multicast communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a DL grant that indicates a set of DL resources for a DL transmission to a set of UEs including the UE. The operations of 1605 may be performed according to the methods described herein. In some examples, aspects of the operations of 1605 may be performed by a grant receiver as described with reference to FIGS. 7 through 10.

At 1610, the UE may receive the DL grant via a DL transmission beam configured for the set of UEs. The operations of 1610 may be performed according to the methods described herein. In some examples, aspects of the operations of 1610 may be performed by a grant receiver as described with reference to FIGS. 7 through 10.

At 1615, the UE may receive one or more additional DL grants via respective DL transmission beams, where each additional DL grant indicates a respective additional set of DL resources for the DL transmission. The operations of 1615 may be performed according to the methods described herein. In some examples, aspects of the operations of 1615 may be performed by a grant receiver as described with reference to FIGS. 7 through 10.

At 1620, the UE may identify a set of UL resources for negative acknowledgment feedback information corresponding to the DL transmission based on the DL grant. The operations of 1620 may be performed according to the methods described herein. In some examples, aspects of the operations of 1620 may be performed by an uplink resource identifier as described with reference to FIGS. 7 through 10.

At 1625, the UE may identify additional sets of UL resources for negative acknowledgment feedback information corresponding to the DL transmission based on the one or more additional DL grants. The operations of 1625 may be performed according to the methods described herein. In some examples, aspects of the operations of 1625 may be performed by an uplink resource identifier as described with reference to FIGS. 7 through 10.

At 1630, the UE may monitor the set of DL resources and the additional sets of DL resources for the DL transmission from the base station. The operations of 1630 may be performed according to the methods described herein. In some examples, aspects of the operations of 1630 may be performed by a monitoring component as described with reference to FIGS. 7 through 10.

At 1635, the UE may transmit a feedback message to the base station via the set of UL resources based on the monitoring, where the feedback message indicates that reception of the DL transmission was unsuccessful. The operations of 1640 may be performed according to the methods described herein. In some examples, aspects of the operations of 1640 may be performed by a feedback manager as described with reference to FIGS. 7 through 10.

Figure 17:
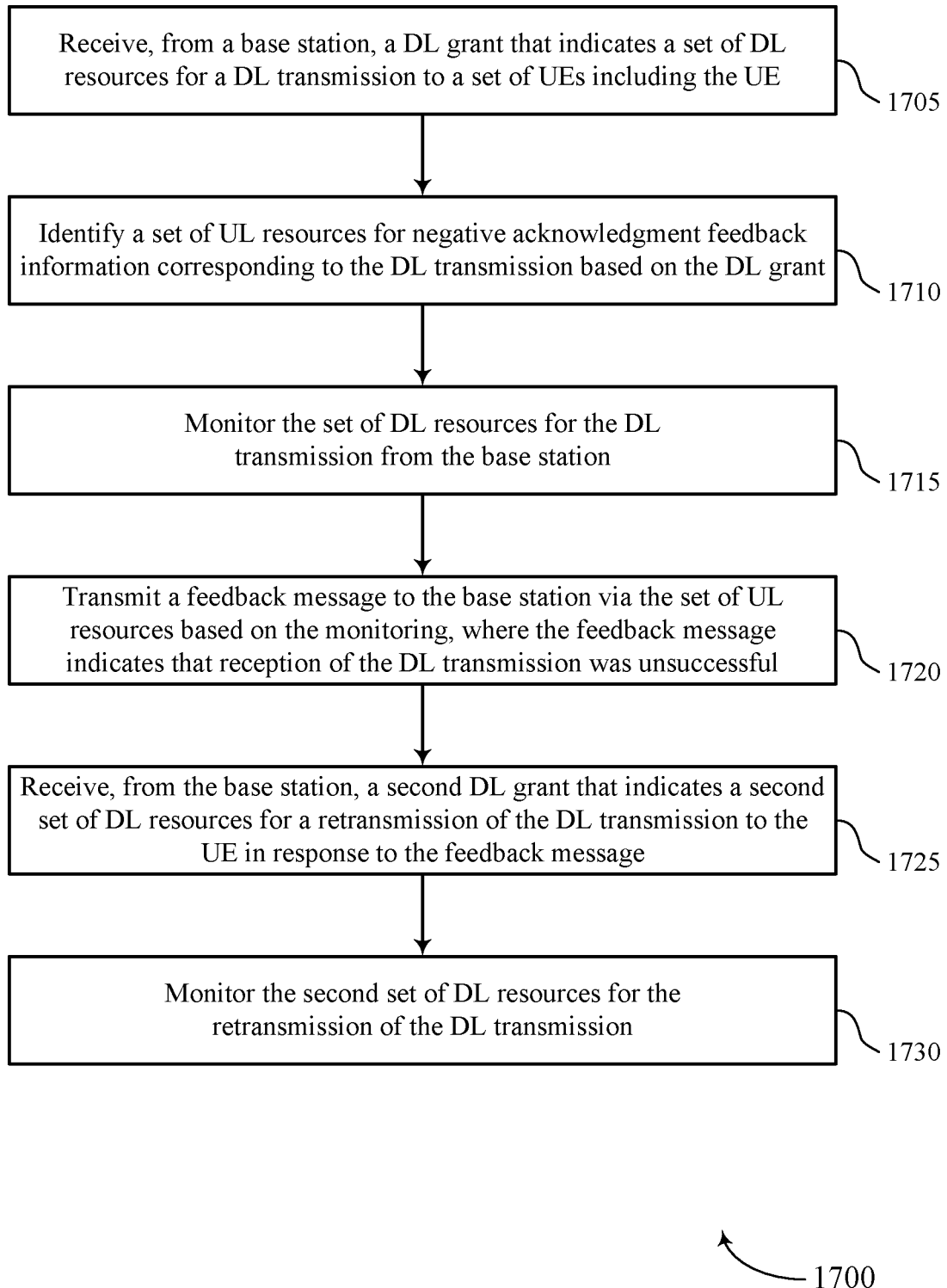

FIG. 17 shows a flowchart illustrating a method 1700 that supports feedback for multicast communications in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a DL grant that indicates a set of DL resources for a DL transmission to a set of UEs including the UE. The operations of 1705 may be performed according to the methods described herein. In some examples, aspects of the operations of 1705 may be performed by a grant receiver as described with reference to FIGS. 7 through 10.

At 1710, the UE may identify a set of UL resources for negative acknowledgment feedback information corresponding to the DL transmission based on the DL grant. The operations of 1710 may be performed according to the methods described herein. In some examples, aspects of the operations of 1710 may be performed by an uplink resource identifier as described with reference to FIGS. 7 through 10.

At 1715, the UE may monitor the set of DL resources for the DL transmission from the base station. The operations of 1715 may be performed according to the methods described herein. In some examples, aspects of the operations of 1715 may be performed by a monitoring component as described with reference to FIGS. 7 through 10.

At 1720, the UE may transmit a feedback message to the base station via the set of UL resources based on the monitoring, where the feedback message indicates that reception of the DL transmission was unsuccessful. The operations of 1720 may be performed according to the methods described herein. In some examples, aspects of the operations of 1720 may be performed by a feedback manager as described with reference to FIGS. 7 through 10.

At 1725, the UE may receive, from the base station, a second DL grant that indicates a second set of DL resources for a retransmission of the DL transmission to the UE in response to the feedback message. The operations of 1725 may be performed according to the methods described herein. In some examples, aspects of the operations of 1725 may be performed by a grant receiver as described with reference to FIGS. 7 through 10.

At 1730, the UE may monitor the second set of DL resources for the retransmission of the DL transmission. The operations of 1730 may be performed according to the methods described herein. In some examples, aspects of the operations of 1730 may be performed by a monitoring component as described with reference to FIGS. 7 through 10.

Figure 18:
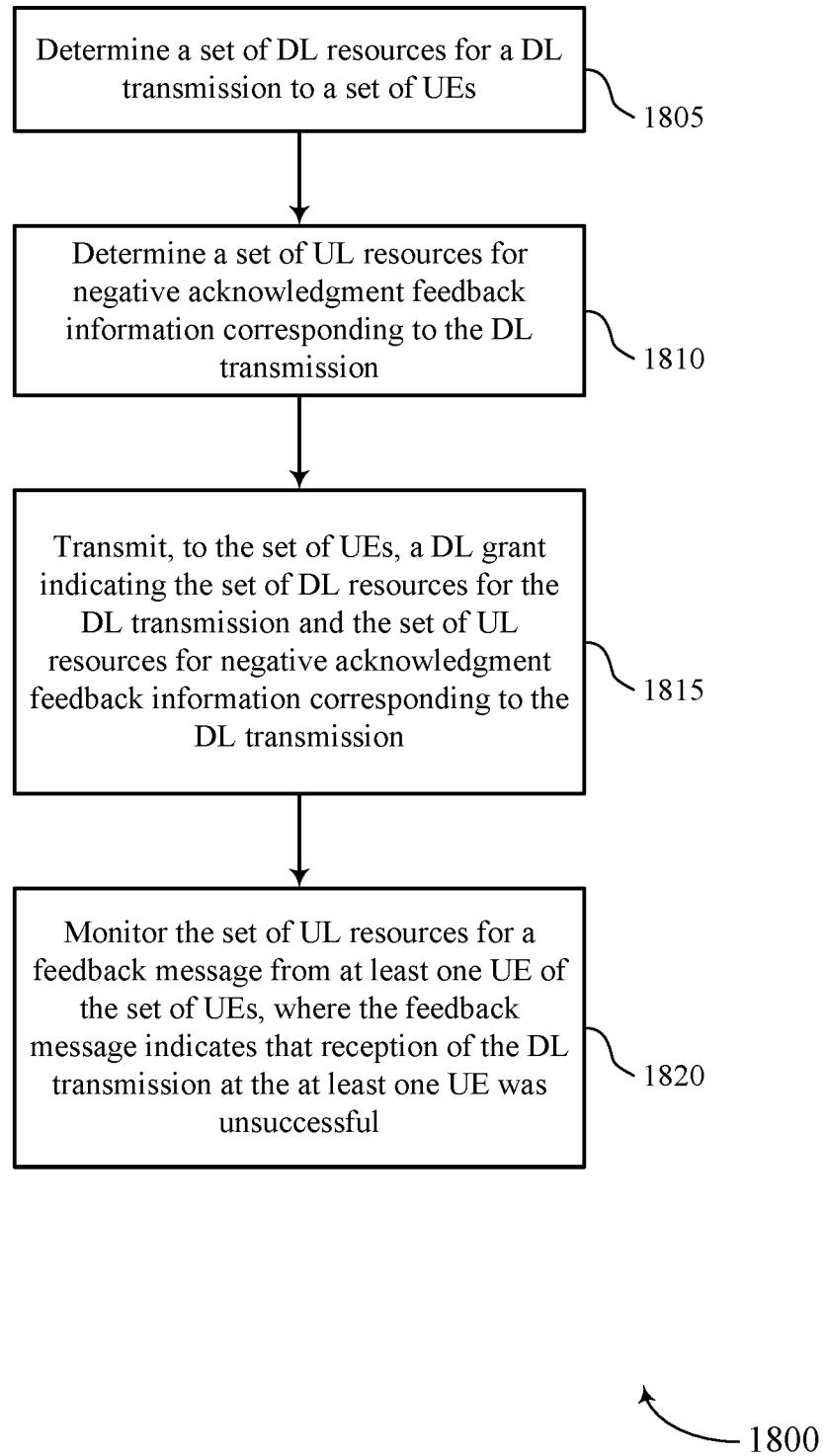

FIG. 18 shows a flowchart illustrating a method 1800 that supports feedback for multicast communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may determine a set of DL resources for a DL transmission to a set of UEs. The operations of 1805 may be performed according to the methods described herein. In some examples, aspects of the operations of 1805 may be performed by a downlink resource component as described with reference to FIGS. 11 through 14.

At 1810, the base station may determine a set of UL resources for negative acknowledgment feedback information corresponding to the DL transmission. The operations of 1810 may be performed according to the methods described herein. In some examples, aspects of the operations of 1810 may be performed by an uplink resource component as described with reference to FIGS. 11 through 14.

At 1815, the base station may transmit, to the set of UEs, a DL grant indicating the set of DL resources for the DL transmission and the set of UL resources for negative acknowledgment feedback information corresponding to the DL transmission. The operations of 1815 may be performed according to the methods described herein. In some examples, aspects of the operations of 1815 may be performed by a grant transmitter as described with reference to FIGS. 11 through 14.

At 1820, the base station may monitor the set of UL resources for a feedback message from at least one UE of the set of UEs, where the feedback message indicates that reception of the DL transmission at the at least one UE was unsuccessful. The operations of 1820 may be performed according to the methods described herein. In some examples, aspects of the operations of 1820 may be performed by a resource monitor as described with reference to FIGS. 11 through 14.

Figure 19:
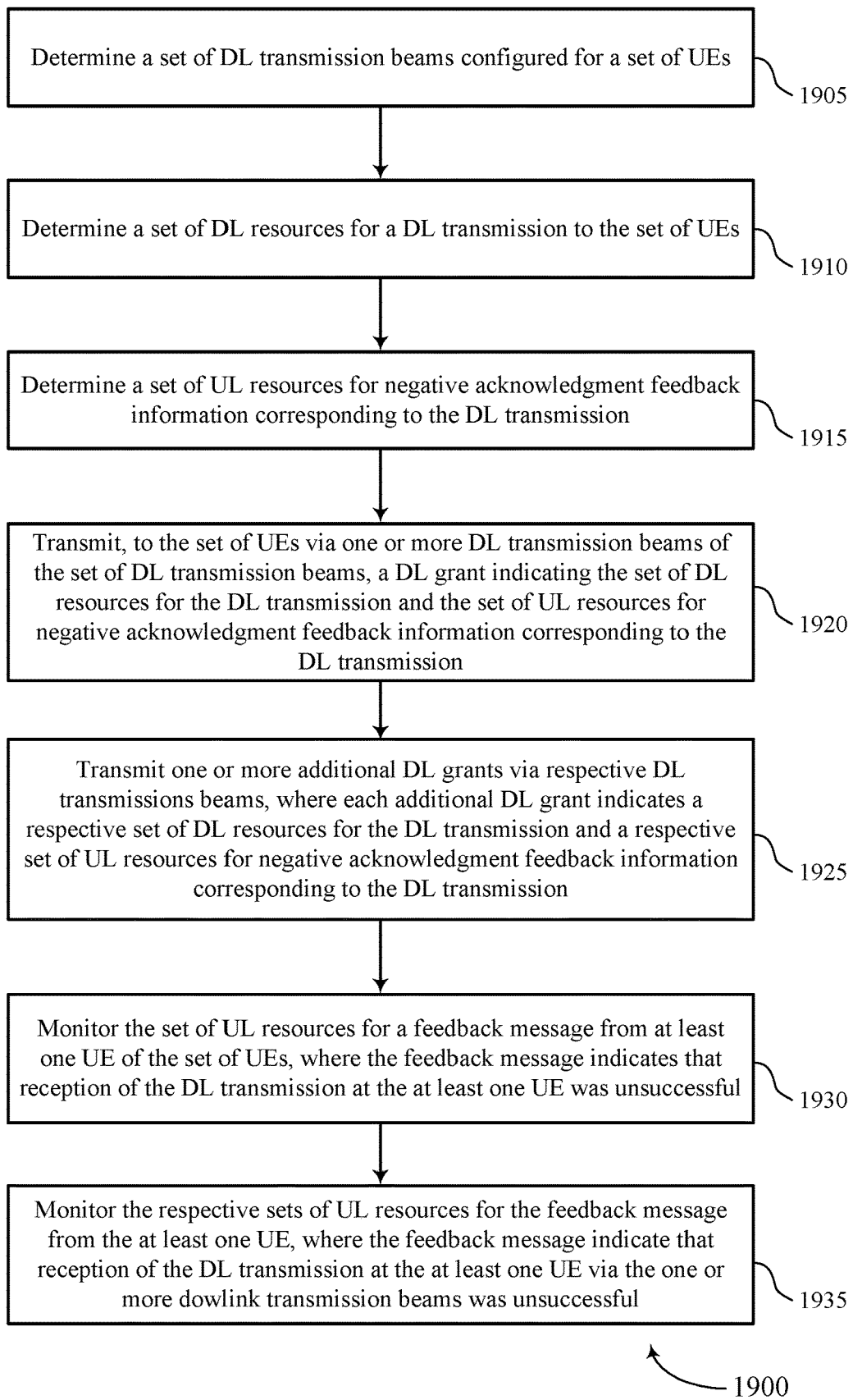

FIG. 19 shows a flowchart illustrating a method 1900 that supports feedback for multicast communications in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below.

Additionally or alternatively, a base station may perform aspects of the functions described below using special-purpose hardware.

At 1905, the base station may determine a set of DL transmission beams configured for a set of UEs. The operations of 1905 may be performed according to the methods described herein. In some examples, aspects of the operations of 1905 may be performed by a transmission beam manager as described with reference to FIGS. 11 through 14.

At 1910, the base station may determine a set of DL resources for a DL transmission to the set of UEs. The operations of 1910 may be performed according to the methods described herein. In some examples, aspects of the operations of 1910 may be performed by a downlink resource component as described with reference to FIGS. 11 through 14.

At 1915, the base station may determine a set of UL resources for negative acknowledgment feedback information corresponding to the DL transmission. The operations of 1915 may be performed according to the methods described herein. In some examples, aspects of the operations of 1915 may be performed by an uplink resource component as described with reference to FIGS. 11 through 14.

At 1920, the base station may transmit, to the set of UEs via one or more DL transmission beams of the set of DL transmission beams, a DL grant indicating the set of DL resources for the DL transmission and the set of UL resources for negative acknowledgment feedback information corresponding to the DL transmission. The operations of 1920 may be performed according to the methods described herein. In some examples, aspects of the operations of 1920 may be performed by a grant transmitter as described with reference to FIGS. 11 through 14.

At 1925, the base station may transmit one or more additional DL grants via respective DL transmissions beams, where each additional DL grant indicates a respective set of DL resources for the DL transmission and a respective set of UL resources for negative acknowledgment feedback information corresponding to the DL transmission. The operations of 1930 may be performed according to the methods described herein. In some examples, aspects of the operations of 1930 may be performed by a grant transmitter as described with reference to FIGS. 11 through 14.

At 1930, the base station may monitor the set of UL resources for a feedback message from at least one UE of the set of UEs, where the feedback message indicates that reception of the DL transmission at the at least one UE was unsuccessful. The operations of 1935 may be performed according to the methods described herein. In some examples, aspects of the operations of 1935 may be performed by a resource monitor as described with reference to FIGS. 11 through 14.

At 1935, the base station may monitor the respective sets of UL resources for the feedback message from the at least one UE, where the feedback message indicate that reception of the DL transmission at the at least one UE via the one or more DL transmission beams was unsuccessful. The operations of 1940 may be performed according to the methods described herein. In some examples, aspects of the operations of 1940 may be performed by a resource monitor as described with reference to FIGS. 11 through 14.

Figure 20:
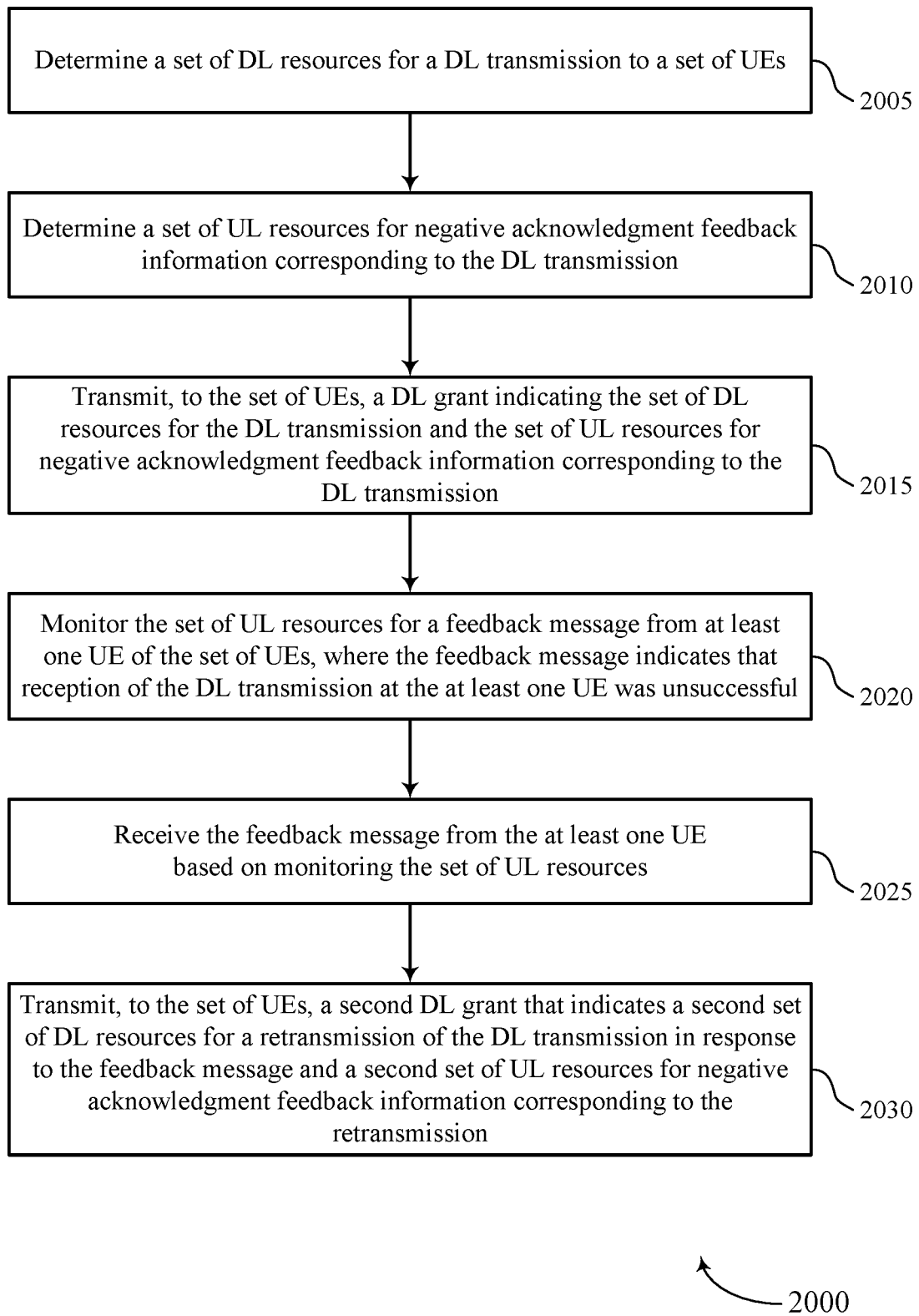

FIG. 20 shows a flowchart illustrating a method 2000 that supports feedback for multicast communications in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may determine a set of DL resources for a DL transmission to a set of UEs. The operations of 2005 may be performed according to the methods described herein. In some examples, aspects of the operations of 2005 may be performed by a downlink resource component as described with reference to FIGS. 11 through 14.

At 2010, the base station may determine a set of UL resources for negative acknowledgment feedback information corresponding to the DL transmission. The operations of 2010 may be performed according to the methods described herein. In some examples, aspects of the operations of 2010 may be performed by an uplink resource component as described with reference to FIGS. 11 through 14.

At 2015, the base station may transmit, to the set of UEs, a DL grant indicating the set of DL resources for the DL transmission and the set of UL resources for negative acknowledgment feedback information corresponding to the DL transmission. The operations of 2015 may be performed according to the methods described herein. In some examples, aspects of the operations of 2015 may be performed by a grant transmitter as described with reference to FIGS. 11 through 14.

At 2020, the base station may monitor the set of UL resources for a feedback message from at least one UE of the set of UEs, where the feedback message indicates that reception of the DL transmission at the at least one UE was unsuccessful. The operations of 2020 may be performed according to the methods described herein. In some examples, aspects of the operations of 2020 may be performed by a resource monitor as described with reference to FIGS. 11 through 14.

At 2025, the base station may receive the feedback message from the at least one UE based on monitoring the set of UL resources. The operations of 2025 may be performed according to the methods described herein. In some examples, aspects of the operations of 2025 may be performed by a feedback receiver as described with reference to FIGS. 11 through 14.

At 2030, the base station may transmit, to the set of UEs, a second DL grant that indicates a second set of DL resources for a retransmission of the DL transmission in response to the feedback message and a second set of UL resources for negative acknowledgment feedback information corresponding to the retransmission. The operations of 2030 may be performed according to the methods described herein. In some examples, aspects of the operations of 2030 may be performed by a grant transmitter as described with reference to FIGS. 11 through 14.

Figure 21:
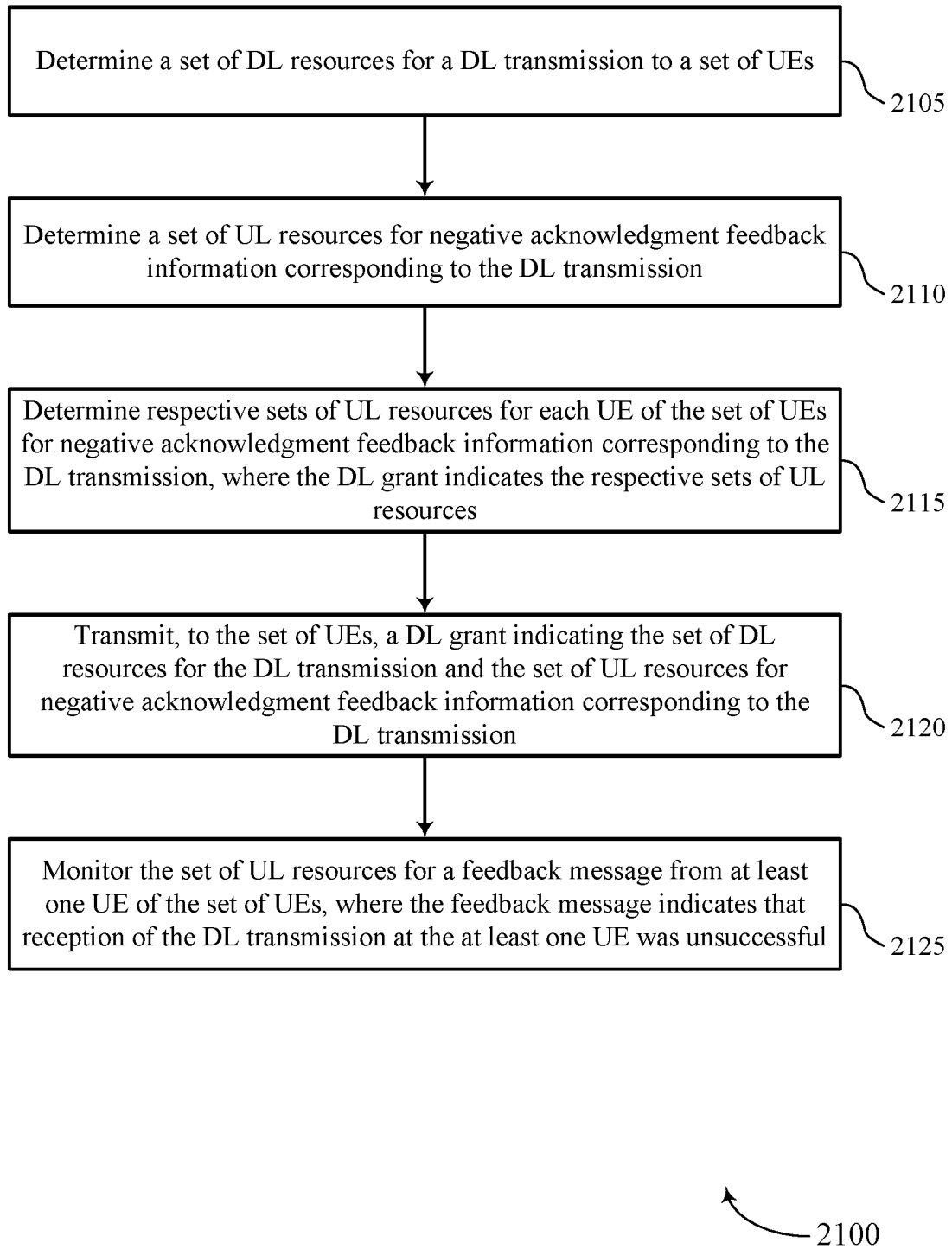

FIG. 21 shows a flowchart illustrating a method 2100 that supports feedback for multicast communications in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may determine a set of DL resources for a DL transmission to a set of UEs. The operations of 2105 may be performed according to the methods described herein. In some examples, aspects of the operations of 2105 may be performed by a downlink resource component as described with reference to FIGS. 11 through 14.

At 2110, the base station may determine a set of UL resources for negative acknowledgment feedback information corresponding to the DL transmission. The operations of 2110 may be performed according to the methods described herein. In some examples, aspects of the operations of 2110 may be performed by an uplink resource component as described with reference to FIGS. 11 through 14.

At 2115, the base station may determine respective sets of UL resources for each UE of the set of UEs for negative acknowledgment feedback information corresponding to the DL transmission, where the DL grant indicates the respective sets of UL resources. The operations of 2115 may be performed according to the methods described herein. In some examples, aspects of the operations of 2115 may be performed by an uplink resource component as described with reference to FIGS. 11 through 14.

At 2120, the base station may transmit, to the set of UEs, a DL grant indicating the set of DL resources for the DL transmission and the set of UL resources for negative acknowledgment feedback information corresponding to the DL transmission. The operations of 2120 may be performed according to the methods described herein. In some examples, aspects of the operations of 2120 may be performed by a grant transmitter as described with reference to FIGS. 11 through 14.

At 2125, the base station may monitor the set of UL resources for a feedback message from at least one UE of the set of UEs, where the feedback message indicates that reception of the DL transmission at the at least one UE was unsuccessful. The operations of 2125 may be performed according to the methods described herein. In some examples, aspects of the operations of 2125 may be performed by a resource monitor as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, a downlink grant that indicates a set of downlink resources for a downlink transmission to a plurality of UEs including the UE, wherein the downlink grant further indicates respective sets of uplink resources for each UE of the plurality of UEs;
   identifying, from the respective sets of uplink resources, a set of uplink resources for the UE for negative acknowledgment feedback information corresponding to the downlink transmission based at least in part on the downlink grant;
   monitoring the set of downlink resources for the downlink transmission from the base station; and
   transmitting a feedback message to the base station via the set of uplink resources based at least in part on the monitoring, wherein the feedback message indicates that reception of the downlink transmission was unsuccessful.

2. The method of claim 1, further comprising:
   receiving the downlink grant via a downlink transmission beam configured for the plurality of UEs.

3. The method of claim 2, further comprising:
   receiving one or more additional downlink grants via respective downlink transmission beams, wherein each additional downlink grant indicates a respective additional set of downlink resources for the downlink transmission;
   identifying additional sets of uplink resources for negative acknowledgment feedback information corresponding to the downlink transmission based at least in part on the one or more additional downlink grants; and
   monitoring the additional sets of downlink resources for the downlink transmission from the base station.

4. The method of claim 3, further comprising:
   transmitting an additional feedback message to the base station via a respective additional set of uplink resources based at least in part on monitoring the additional sets of downlink resources, wherein the additional feedback message indicates that reception of the downlink transmission was unsuccessful.

5. The method of claim 3, further comprising:
combining information received via the additional sets of downlink resources based at least in part on the monitoring;
determining that reception of the downlink transmission was unsuccessful based at least in part on the combining; and
transmitting a set of feedback messages including the feedback message over respective additional sets of uplink resources for negative acknowledgment feedback information.

6. The method of claim 3, further comprising:
measuring a link quality of a set of uplink transmission beams configured for communications with the base station; and
transmitting the feedback message via at least one of the set of uplink transmission beams based at least in part on the link quality.

7. The method of claim 1, further comprising:
determining that a decoding procedure for the downlink transmission was unsuccessful based at least in part on the monitoring; and
transmitting the feedback message based at least in part on determining that the decoding procedure for the downlink transmission was unsuccessful.

8. The method of claim 1, further comprising:
receiving, from the base station, a second downlink grant that indicates a second set of downlink resources for a retransmission of the downlink transmission to the UE in response to the feedback message;
monitoring the second set of downlink resources for the retransmission of the downlink transmission; and
transmitting, based at least in part on monitoring the second set of downlink resources, a second feedback message to the base station via a second set of uplink resources for negative acknowledgment feedback information indicated by the second downlink grant, wherein the feedback message indicates that reception of the retransmission was unsuccessful.

9. The method of claim 1, wherein the set of uplink resources comprises a physical uplink control channel (PUCCH), a physical uplink shared channel (PUSCH), a random access channel (RACH), uplink resources within a system bandwidth, uplink resources outside the system bandwidth, or any combination thereof.

10. The method of claim 1, further comprising:
receiving the downlink grant via a physical downlink control channel (PDCCH).

11. The method of claim 1, wherein monitoring the set of downlink resources comprises:
monitoring a physical downlink shared channel (PDSCH) for the downlink transmission.

12. The method of claim 1, wherein the feedback message comprises a hybrid automatic repeat request (HARQ) negative acknowledgment (NACK) message, a bit sequence, a message preamble, or a combination thereof.

13. The method of claim 1, wherein:
the downlink grant comprises an uplink resource indicator and a feedback timing indicator that indicates the set of uplink resources;
the feedback timing indicator comprises a physical downlink shared channel (PDSCH) to hybrid automatic repeat request (HARQ) feedback timing indicator;
the uplink resource indicator comprises a physical uplink control channel (PUCCH) resource indicator; and
the uplink resource indicator and the feedback timing indicator are included in downlink control information (DCI) containing the downlink grant.

14. A method for wireless communications at a base station, comprising:
determining a set of downlink resources for a downlink transmission to a plurality of user equipment (UEs);
determining respective sets of uplink resources for each UE of the plurality of UEs for negative acknowledgment feedback information corresponding to the downlink transmission;
transmitting, to the plurality of UEs, a downlink grant indicating the set of downlink resources for the downlink transmission and the respective sets of uplink resources for negative acknowledgment feedback information corresponding to the downlink transmission; and
monitoring the respective sets of uplink resources for a feedback message from at least one UE of the plurality of UEs, wherein the feedback message indicates that reception of the downlink transmission at the at least one UE was unsuccessful.

15. The method of claim 14, further comprising:
determining a set of downlink transmission beams configured for the plurality of UEs; and
transmitting the downlink grant to the plurality of UEs via one or more downlink transmission beams of the set of downlink transmission beams.

16. The method of claim 15, further comprising:
transmitting one or more additional downlink grants via respective downlink transmissions beams, wherein each additional downlink grant indicates a respective set of downlink resources for the downlink transmission and a respective additional set of uplink resources for negative acknowledgment feedback information corresponding to the downlink transmission.

17. The method of claim 16, further comprising:
monitoring the respective additional sets of uplink resources for the feedback message from the at least one UE, wherein the feedback message indicate that reception of the downlink transmission at the at least one UE via the one or more downlink transmission beams was unsuccessful.

18. The method of claim 14, further comprising:
receiving the feedback message from the at least one UE based at least in part on monitoring the respective sets of uplink resources; and
transmitting, to the plurality of UEs, a second downlink grant that indicates a second set of downlink resources for a retransmission of the downlink transmission in response to the feedback message and a second set of uplink resources for negative acknowledgment feedback.

19. The method of claim 18, further comprising:
identifying a downlink transmission beam and downlink resources corresponding to uplink resources over which the feedback message from the at least one UE is received; and
transmitting the second downlink grant via the downlink transmission beam and the downlink resources.

20. The method of claim 14, wherein the set of uplink resources comprises a physical uplink control channel (PUCCH), a physical uplink shared channel (PUSCH), a random access channel (RACH), uplink resources within a system bandwidth, uplink resources outside the system bandwidth, or any combination thereof.

21. The method of claim 14, wherein at least two of the respective sets of uplink resources at least partially overlap.

22. The method of claim 14, further comprising:
determining a common sequence and a common time and frequency resource mapping for the plurality of UEs; and
transmitting an indication of the common sequence and the common time and frequency resource mapping to the plurality of UEs.

23. The method of claim 14, wherein:
the downlink grant comprises an uplink resource indicator and a feedback timing indicator that indicates a set of uplink resources of the respective sets of uplink resources;
the feedback timing indicator comprises a physical downlink shared channel (PDSCH) to hybrid automatic repeat request (HARD) feedback timing indicator; and
the uplink resource indicator comprises a physical uplink control channel (PUCCH) resource indicator.

24. The method of claim 23, further comprising:
transmitting downlink control information (DCI) to the plurality of UEs, the DCI comprising the uplink resource indicator and the feedback timing indicator.

25. The method of claim 14, wherein transmitting the downlink grant comprises:
transmitting the downlink grant in a physical downlink control channel (PDCCH).

26. The method of claim 14, further comprising:
transmitting the downlink transmission in a physical downlink shared channel (PDSCH).

27. The method of claim 14, wherein the feedback message comprises a negative acknowledgment (NACK) message.

28. A user equipment (UE) for wireless communications, comprising:
a processor,
a memory coupled with the processor; and
instructions stored in the memory and executable by the processor to cause the UE to:
receive, from a base station, a downlink grant that indicates a set of downlink resources for a downlink transmission to a plurality of UEs including the UE, wherein the downlink grant further indicates respective sets of uplink resources for each UE of the plurality of UEs;
identify, from the respective sets of uplink resources, a set of uplink resources for the UE for negative acknowledgment feedback information corresponding to the downlink transmission based at least in part on the downlink grant;
monitor the set of downlink resources for the downlink transmission from the base station; and
transmit a feedback message to the base station via the set of uplink resources based at least in part on the monitoring, wherein the feedback message indicates that reception of the downlink transmission was unsuccessful.

29. A base station for wireless communications, comprising:
a processor,
a memory coupled with the processor; and
instructions stored in the memory and executable by the processor to cause the base station to:
determine a set of downlink resources for a downlink transmission to a plurality of user equipment (UEs);
determine respective sets of uplink resources for each UE of the plurality of UEs for negative acknowledgment feedback information corresponding to the downlink transmission;
transmit, to the plurality of UEs, a downlink grant indicating the set of downlink resources for the downlink transmission and the respective sets of uplink resources for negative acknowledgment feedback information corresponding to the downlink transmission; and
monitor the respective sets of uplink resources for a feedback message from at least one UE of the plurality of UEs, wherein the feedback message indicates that reception of the downlink transmission at the at least one UE was unsuccessful.

* * * * *